US008909970B2

(12) United States Patent
Momoi et al.

(10) Patent No.: US 8,909,970 B2
(45) Date of Patent: Dec. 9, 2014

(54) INFORMATION PROCESSING APPARATUS OR INFORMATION PROCESSING METHOD WHICH SUPPLIES A CLOCK TO AN EXTERNAL DEVICE

(75) Inventors: Akiyoshi Momoi, Bangalore (IN); Koichi Morishita, Komae (JP)

(73) Assignee: Canon Kabushiki Kaisha, Tokyo (JP)

( * ) Notice: Subject to any disclaimer, the term of this patent is extended or adjusted under 35 U.S.C. 154(b) by 226 days.

(21) Appl. No.: 13/518,344

(22) PCT Filed: Dec. 21, 2010

(86) PCT No.: PCT/JP2010/007406
§ 371 (c)(1),
(2), (4) Date: Jun. 21, 2012

(87) PCT Pub. No.: WO2011/077707
PCT Pub. Date: Jun. 30, 2011

(65) Prior Publication Data
US 2012/0266009 A1    Oct. 18, 2012

(30) Foreign Application Priority Data
Dec. 25, 2009   (JP) ................................ 2009-295617

(51) Int. Cl.
*H04L 7/00*  (2006.01)
*H04L 7/10*  (2006.01)
*H04L 7/033* (2006.01)

(52) U.S. Cl.
CPC ............... *H04L 7/10* (2013.01); *H04L 7/0337* (2013.01)
USPC ......................................... 713/401; 713/400

(58) Field of Classification Search
CPC ................................... G06F 1/10; G06F 5/06

USPC .................................................. 713/400, 401
See application file for complete search history.

(56) References Cited

U.S. PATENT DOCUMENTS

| 5,922,076 | A  | * | 7/1999  | Garde ........................... 713/600 |
| 2002/0122436 | A1 |   | 9/2002  | Otokawa |
| 2008/0098253 | A1 | * | 4/2008  | Lee et al. ....................... 713/503 |
| 2008/0222445 | A1 | * | 9/2008  | Liran ........................... 713/503 |
| 2009/0322770 | A1 | * | 12/2009 | Bae ................................ 345/522 |
| 2011/0235763 | A1 | * | 9/2011  | Palmer et al. .................. 375/362 |

FOREIGN PATENT DOCUMENTS

| CN | 1236239 A   | 11/1999 |
| CN | 1601432 A   | 3/2005  |
| CN | 1851821 A   | 10/2006 |
| CN | 101416437 A | 4/2009  |

(Continued)

OTHER PUBLICATIONS

U.S. Appl. No. 13/518,321, filed Jun. 21, 2012, Akiyoshi Momoi.

*Primary Examiner* — Vincent Tran
(74) *Attorney, Agent, or Firm* — Canon USA Inc IP Division

(57) ABSTRACT

If data received by the an information processing apparatus from an external device is delayed by one cycle or more with respect to a clock of the information processing apparatus, the information processing apparatus may require an additional process for adjusting a data latch timing.

Delay information indicating a relationship between a calibration pattern to be received and an amount of cycle delay is stored in advance. Thus, the time required for detecting an amount of cycle delay, which is equivalent to the amount by which a signal for controlling a data latch mechanism in the information processing apparatus to stop its operation is delayed, can be reduced.

19 Claims, 22 Drawing Sheets

(56) References Cited

FOREIGN PATENT DOCUMENTS

| JP | 59-173839 A | 10/1984 |
| JP | H05-244134 A | 9/1993 |
| JP | 09-069829 A | 3/1997 |
| JP | 2002-247141 A | 8/2002 |
| WO | 2007/113945 A1 | 10/2007 |

* cited by examiner

| DIFFERENCE FROM ACTUAL NUMBER OF CYCLES | RECEIVED PATTERN |
|---|---|
| 0 | 01010101 |
| 1 | 01011101 |
| 2 | 01010001 |
| 3 | 01011111 |

INFORMATION PROCESSING APPARATUS OR INFORMATION PROCESSING METHOD WHICH SUPPLIES A CLOCK TO AN EXTERNAL DEVICE

TECHNICAL FIELD

The present invention relates to an information processing apparatus or an information processing method in which an information processing apparatus such as an external device controller supplies a clock to an external device and latches therein external device data output from the external device in synchronization with the clock.

BACKGROUND ART

As disclosed in PTL 1, there is a technology for an information processing apparatus including an external device controller, in which when an external device is connected to the information processing apparatus so as to be capable of communicating therewith, an operation clock is supplied from the external device controller of the information processing apparatus to the external device. Here, generally, the external device is set so as to output data in synchronization with the clock supplied from the external device controller, and the external device controller is configured to latch therein the data output from the external device.

With the use of the above method, the external device controller temporarily stops supply of clocks (corresponding to clock gating) to the external device, thus allowing the supply of data from the external device to the external device controller to be temporarily stopped. For example, when data is accumulated up to the allowed capacity of a reception buffer in the external device controller, the external device controller can stop supply of clocks to stop supply of data, thus preventing an overflow of the buffer as desired even if the capacity of the buffer is small.

Here, if data received by the information processing apparatus from the external device is delayed by one cycle or more with respect to a clock of the information processing apparatus, the information processing apparatus may require an additional process for adjusting a data latch timing.

CITATION LIST

Patent Literature

PTL 1: Japanese Patent Laid-Open No. 59-173839

SUMMARY OF INVENTION

Accordingly, the present invention provides an information processing apparatus or an information processing method that requires no additional process for adjusting a timing even if a delay of one cycle or more occurs with respect to an output clock of an external device controller.

In an aspect of the present invention, an information processing apparatus includes a supply unit configured to supply a clock to an external device; an instruction unit configured to instruct the external device to transmit a calibration pattern; a receiving unit configured to receive external device data that is output from the external device in synchronization with the clock; a control unit configured to control the supply unit to stop supply of the clock in accordance with gating information indicating at which timing the supply of the clock is to be stopped; a storage unit configured to hold delay information indicating a relationship between a calibration pattern to be received by the receiving unit and an amount of cycle delay; a detection unit configured to detect an amount of delay per cycle by comparing a calibration pattern received by the receiving unit with the delay information while the control unit is being caused to function; and a delay unit configured to delay a data latch timing of the receiving unit in accordance with the amount of cycle delay.

DESCRIPTION OF EMBODIMENTS

Exemplary embodiments of the present invention will be described hereinafter with reference to the drawings. First, an exemplary embodiment for solving a problem that may be caused when data received by an external device controller from an external device is delayed by one cycle or more with respect to an output clock of the external device controller will be described hereinafter.

Figures 19, 20:
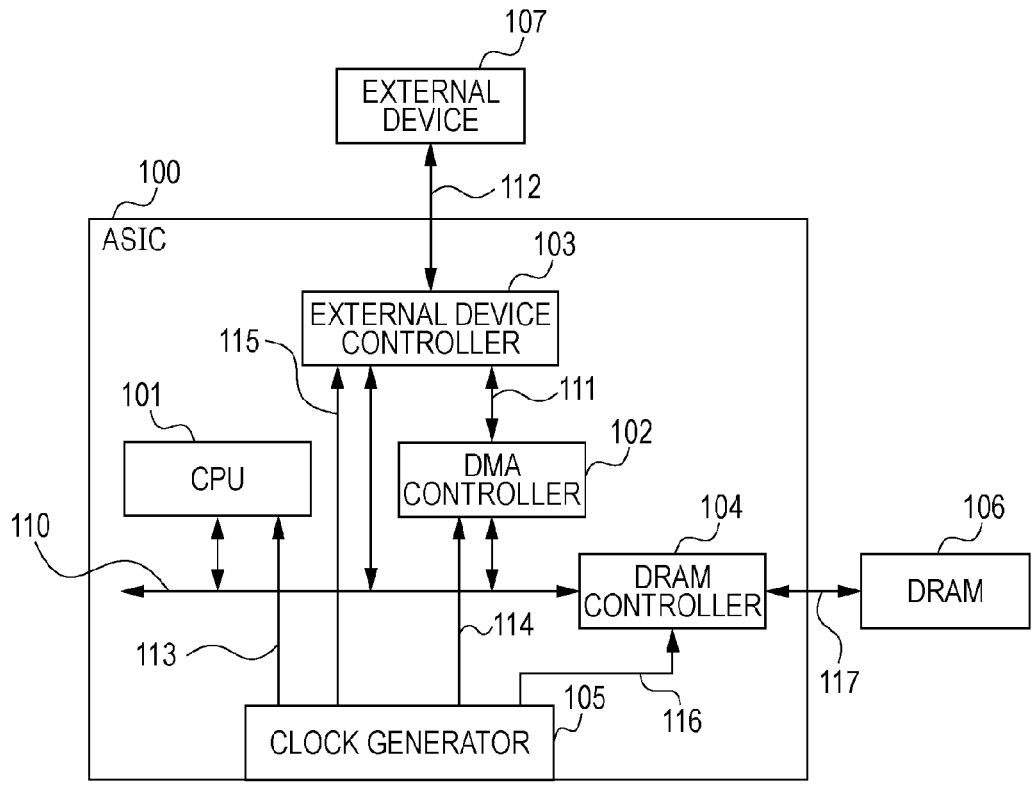
FIG. 19 is a schematic diagram of a system configuration including the external device controller.
FIG. 20 is a table illustrating an example of the relationship between an actually received calibration pattern and a difference from the actual number of cycles.

FIG. 19 is a block diagram of a system including an information processing apparatus that communicates with an external device 107. An application specific integrated circuit (ASIC) 100 which is a large scale integration (LSI) circuit having a function for communicating with the external device 107 includes a central processing unit (CPU) 101, a dynamic random access memory (DRAM) controller 104, a direct memory access (DMA) controller 102, an external device controller 103, and a clock generator 105. Further, the clock generator 105, which serves as oscillation unit, generates and supplies clocks (cpu_clock 113, dmac_clock 114, host_clock 115, dram_clock 116) that are used by the CPU 101, the DMA controller 102, the external device controller 103, and the DRAM controller 104. The CPU 101 performs register access to the external device controller 103, the DMA controller 102, and the DRAM controller 104 via a CPU interface (I/F) 110. The DMA controller 102 performs data transfer to and from the DRAM controller 104 via the CPU I/F 110. The DRAM controller 104 performs data transfer to and from a DRAM 106 via a DRAM I/F 117. The external device controller 103 performs data transfer to and from the DMA controller 102 via a DMA I/F 111. Further, the external device controller 103 performs data transfer to and from the external device 107 via an external device I/F 112.

Figure 1:
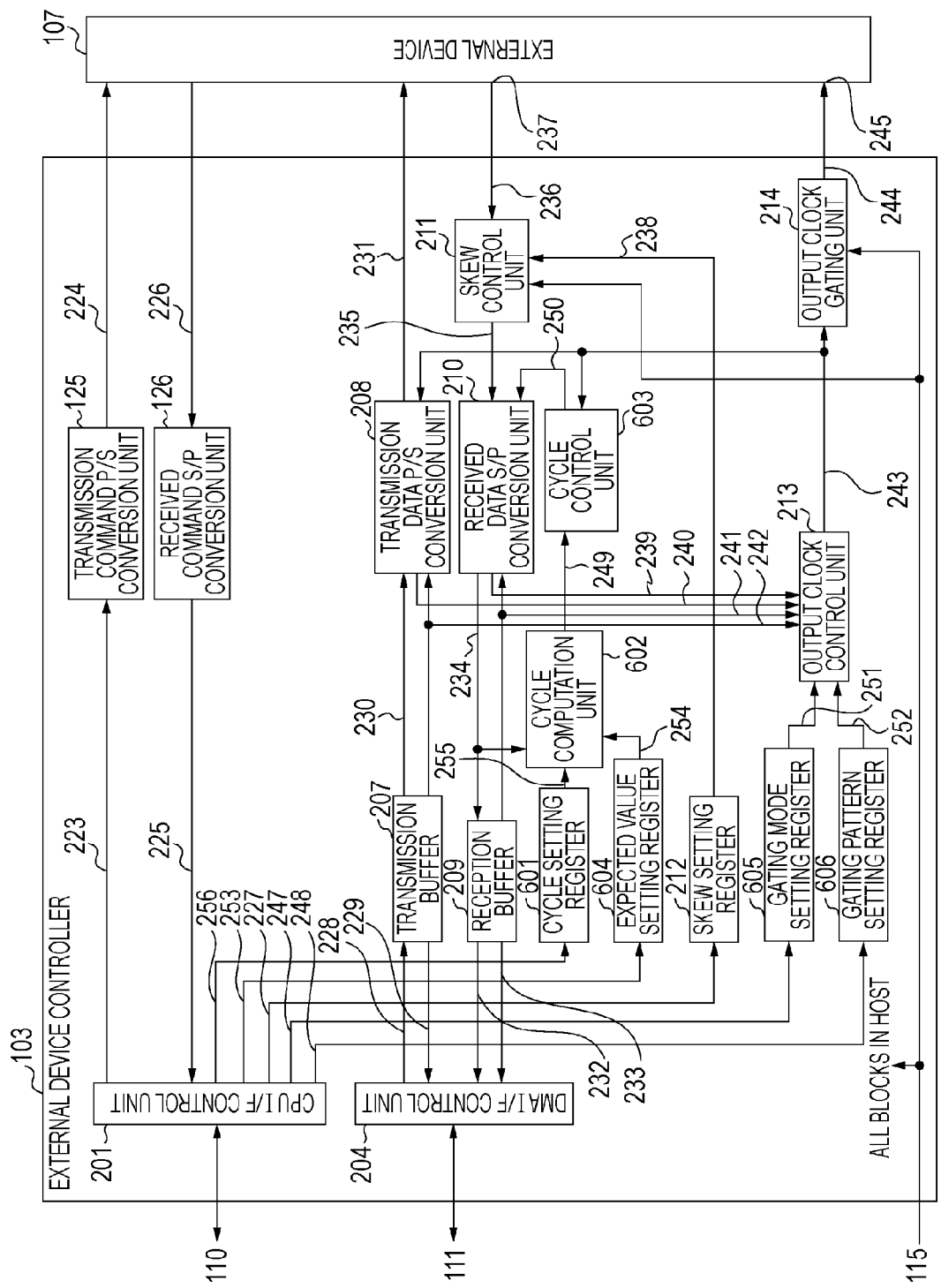
FIG. 1 is a configuration diagram of an external device controller in an exemplary embodiment of the present invention.

Next, an external device controller will be described. FIG. 1 illustrates the configuration of an external device controller 103 in an exemplary embodiment of the present invention.

The external device controller 103 receives a host clock 115 (host_clk) from the clock generator 105. The host clock 115 is connected to each block in the external device controller 103, and each block of the external device controller 103 operates in synchronization with the host clock 115.

While accepting data or commands to be transmitted to a card from the CPU 101 and register access, a CPU I/F control unit 201 transmits commands or data received from the card to the CPU 101. A DMA I/F control unit 204 accepts from the DMA controller 102 data to be transmitted to the external device 107, and also transmits data received from the external device 107 to the DMA controller 102.

The external device controller 103 exchanges commands with the external device 107 via a transmission command parallel-to-serial conversion unit (hereinafter referred to as the "transmission command PS conversion unit") 125 and a received command serial-to-parallel conversion unit (hereinafter referred to as the "received command SP conversion unit") 126. First, the CPU I/F control unit 201 transmits a parallel format transmission command 223 (s_cmd_reg) received from the CPU 101 via the CPU I/F 110 to the transmission command PS conversion unit 125. The transmission command PS conversion unit 125 converts the received parallel format transmission command 223 into a serial format transmission command 224 (s_cmd_data), and transmits the serial format transmission command 224 to the external device 107.

The external device 107 decodes the received serial format transmission command 224, and detects a transmission command. Further, the external device 107 transmits detection information indicating a detection result of the transmission command to the external device controller 103 as a serial format received command 226 (r_cmd_data).

The received command SP conversion unit 126 receives the serial format received command 226 output from the external device 107, converts the serial format received command 226 into a parallel format received command 225 (r_cmd_reg), and transmits the parallel format received command 225 to the CPU 101 via the CPU I/F control unit 201 and the CPU I/F 110.

Further, the external device controller 103 exchanges data with the external device 107 via a transmission buffer 207, a transmission data parallel-to-serial conversion unit 208, a skew control unit 211, a received data serial-to-parallel conversion unit (hereinafter referred to as the "received data SP conversion unit") 210, and a reception buffer 209. The external device controller 103 further includes an output clock control unit 213 and an output clock gating unit 214 in order to de-assert an output clock 244 to suspend supply of data from the external device 107. The external device controller 103 also includes a gating mode setting register 605 and a gating pattern setting register 606 for effective cycle adjustment.

The external device controller 103 further includes the skew control unit 211 and a skew setting register 212 for skew adjustment (correction). Here, the term "skew adjustment (correction)" refers to adjusting (correcting) data to be input to the received data SP conversion unit 210 or the data latch timing (latch timing) of the external device controller 103 (namely, the skew control unit 211) by using a delay within one cycle (with respect to the host clock 115).

The external device controller 103 further includes a cycle setting register 601, a cycle computation unit 602, a cycle control unit 603, and an expected value setting register 604 for cycle adjustment (correction). Here, the term "cycle adjustment (correction)" refers to adjusting (correcting) the data latch suspend timing and data latch resume timing of the received data SP conversion unit 210 by delaying a reception enable signal 250 (rcv_en), which is a control signal of the received data SP conversion unit 210, cycle-by-cycle (with respect to the host clock 115).

The skew setting register 212 receives a skew set value 227 (skew_reg) from the CPU OF control unit 201, and holds the skew set value 227. The skew control unit 211 receives a skew selection value 238 (skew_sel) from the skew setting register 212, and delays serial format received data 236 (d2h_data) (hereinafter sometimes simply short for "received data 236") received from the external device 107 in accordance with the set value.

The cycle setting register 601 receives a cycle set value 256 (cycle_reg) from the
CPU OF control unit 201, and holds the cycle set value 256. The expected value setting register 604 receives an expected value set value 253 (exp_reg) from the CPU I/F control unit 201, and holds the expected value set value 253. An example of the expected value set value 253 is illustrated in FIG. 20. The pattern received when the difference from the actual number of cycles is 0 matches the true value (the pattern output from the external device 107) while the pattern received by the external device controller 103 changes in accordance with the difference between the cycle set value obtained when calibration is performed and the correct cycle set value (corresponding to the amount of cycle delay described below). The cycle computation unit 602 receives a cycle set value 255 (cycle_val) from the cycle setting register 601 and the expected value 254 (exp_pattern) from the expected value setting register 604, and computes a desired cycle set value. Specifically, a received calibration pattern is compared with the expected value to determine whether a match is found. The difference between a cycle set value corresponding to the expected value obtained when a match is found and the correct cycle set value is determined. Thereafter, the determined difference is added to a cycle set value obtained when calibration is performed to compute a correct cycle set value. The cycle control unit 603 receives a correct cycle selection value 249 (cycle_sel) from the cycle computation unit 602. The cycle control unit 603 further receives an output clock enable signal 243 (dev_clk_en) (clock control signal) from the output clock control unit 213.

Data Receiving Process

Next, a process in which the external device controller 103 receives data (external device data) from the external device 107 will be described.

When the external device controller 103 starts data reception, first, the external device controller 103 performs the command transmission/reception process described above to transmit a command for instructing the external device 107 to transmit data to the external device 107. Further, the external device 107 transmits a response to the transmitted command to the external device controller 103 as a reception command, and further transmits data.

Reception of data is performed as follow. First, the serial format received data 236 (d2h_data) transmitted from the external device 107 is received by the skew control unit 211.

The skew control unit 211 performs skew adjustment (the details of which will be described below) between the serial format received data 236 and the clock 115 (host_clk) of the external device controller 103. Skew-adjusted received data 235 (d2h_data_1d) is input to the received data SP conversion unit 210.

The received data SP conversion unit 210 is configured to be capable of receiving a reception enable signal 250 (the details of which will be described below) obtained by delaying, by the cycle control unit 603 described below, the output clock enable signal 243 output from the output clock control unit 213. If the reception enable signal 250 has been asserted, the received data SP conversion unit 210 receives the input skew-adjusted received data 235, and converts the received data 235 into parallel format received data 234 (r_data_buf).

The received data SP conversion unit 210 includes shift registers (series-input/parallel-output flip-flops) of K stages (not illustrated) configured to send data received in a serial format as K-bit parallel format data. Therefore, if the reception enable signal 250 continues to be asserted, the received data SP conversion unit 210 sends parallel format data once every K cycles. Here, the timing at which the received data SP conversion unit 210 latches therein data (external device data) from the external device 107 can correspond to the latch timing of the flip-flop of the first stage (0-bit) (as viewed from the external device 107 side).

The reception buffer 209, which serves as a holding unit, is configured to be capable of notifying using a reception buffer full signal 241 (r_buff_full) that data more than the data currently held therein cannot be held. Thus, if the reception enable signal 250 has been asserted and the reception buffer full signal 241 of the reception buffer 209 has been de-asserted, the received data SP conversion unit 210 transmits the parallel format received data 234 to the reception buffer 209.

If the reception enable signal 250 has not been asserted, the received data SP conversion unit 210 stops receiving the skew-adjusted received data 235.

Upon starting reception of data, the received data SP conversion unit 210 asserts a reception status signal 239 (rcv_status). The received data SP conversion unit 210 continues to assert the reception status signal 239 until the last piece of data is received from the external device 107, and de-asserts the reception status signal 239 upon detection of the end bit of the skew-adjusted received data 235. When the received data SP conversion unit 210 transmits the parallel format received data 234 to the reception buffer 209, the reception buffer 209 de-asserts a reception buffer empty signal 233 (r_buff_emp).

The reception buffer 209 receives the received data 234 (r_data_buff) converted into a parallel format from the received data SP conversion unit 210, and holds the received data 234. Here, when the reception buffer 209 becomes full, the reception buffer 209 asserts the reception buffer full signal 241 to the output clock control unit 213 and the received data SP conversion unit 210. When the reception buffer 209 becomes empty, the reception buffer 209 asserts the reception buffer empty signal 233 to the DMA I/F control unit 204.

In response to de-assertion of the reception buffer empty signal 233 of the reception buffer 209, the DMA I/F control unit 204 detects that received data from the external device unit 107 is left in the reception buffer 209. Then, parallel format received data 232 (r_data_dma) held in the reception buffer 209 is received from the reception buffer 209, and is transmitted to the DMA I/F 111. However, when the reception buffer 209 becomes empty, reception of data is stopped. If reception of data is not stopped, the buffer under-run of the reception buffer 209 may occur. Therefore, when the reception buffer empty signal 233 of the reception buffer 209 has been asserted, the DMA I/F control unit 204 stops receiving the parallel format received data 232, and stops transmitting data to the DMA I/F 111.

If the reception buffer empty signal 233 of the reception buffer 209 is de-asserted, the DMA I/F control unit 204 resumes receiving the parallel format received data 232, and resumes transmission of received data to the DMA I/F 111.

On the other hand, if a write into the reception buffer 209 newly occurs when the reception buffer 209 is in a full state, the buffer over-run of the reception buffer 209 occurs and therefore reception of data is stopped. When the received data SP conversion unit 210 is currently receiving data and when the reception buffer 209 is full, the output clock control unit 213 de-asserts the output clock enable signal 243.

Reception of data in progress in the received data SP conversion unit 210 is detected through assertion of the reception status signal 239. Upon receipt of the first piece of received data, the received data SP conversion unit 210 asserts the reception status signal 239, continues to assert it until the last piece of data is received, and de-asserts it upon receipt of the last piece of data. Thus, the output clock enable signal 243 is not de-asserted in the state of waiting for data to be received (state of waiting for the start bit to be detected).

In response to de-assertion of the output clock 244 (dev_clk), the external device 107 stops transmission of received data 237 (d2h_data'). Reception of data is continuously stopped until the reception buffer full signal 241 (r_buff_full) of the reception buffer 209 is de-asserted. When the reception buffer full signal 241 (r_buff_full) of the reception buffer 209 is de-asserted, the received data SP conversion unit 210 resumes receiving data. Then, the output clock gating unit 214 releases gating of the output clock 244, and the external device 107 resumes transmission of the received data 237.

Skew Correction Configuration

Next, the details of a configuration for skew correction will be described.

Figure 2A:
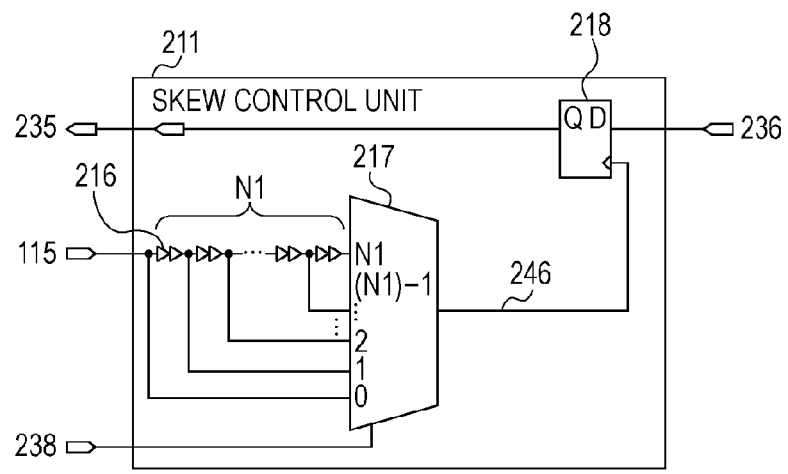
FIG. 2A is a configuration diagram of a skew control unit.

FIG. 2A is a block diagram of the skew control unit 211. The skew control unit 211 receives the host clock 115 (host_clk) from the clock generator 105 (FIG. 19). The host clock 115 is delayed by using delay elements 216 (first delay unit), the number of which is N1, whose inputs and outputs are connected in series. The output of each delay element 216 is input to a delay selection unit 217, and a delay element 216 that is used for the output is selected on the basis of the value of the skew selection value 238 (skew_sel).

A selected clock signal with delay 246 (clk_with_skew) is input to a flip-flop 218 as a clock. The serial format received data 236 (d2h_data) transmitted from the external device 107 is received by the flip-flop 218, and is synchronized with the clock signal with delay 246 (clk_with_skew) by the flip-flop 218. The synchronized serial format received data is output from the skew control unit 211 to the received data SP conversion unit 210 as skew-adjusted serial format received data 235 (d2h_data_1d) (hereinafter referred to as "skew-adjusted received data" 235).

The N1 delay elements in the skew control unit 211 may cause a delay of a duration equal to one N1-th of one clock (of the host clock 115), which is equally divided into N1 segments, or a slightly smaller delay.

Figure 2B:
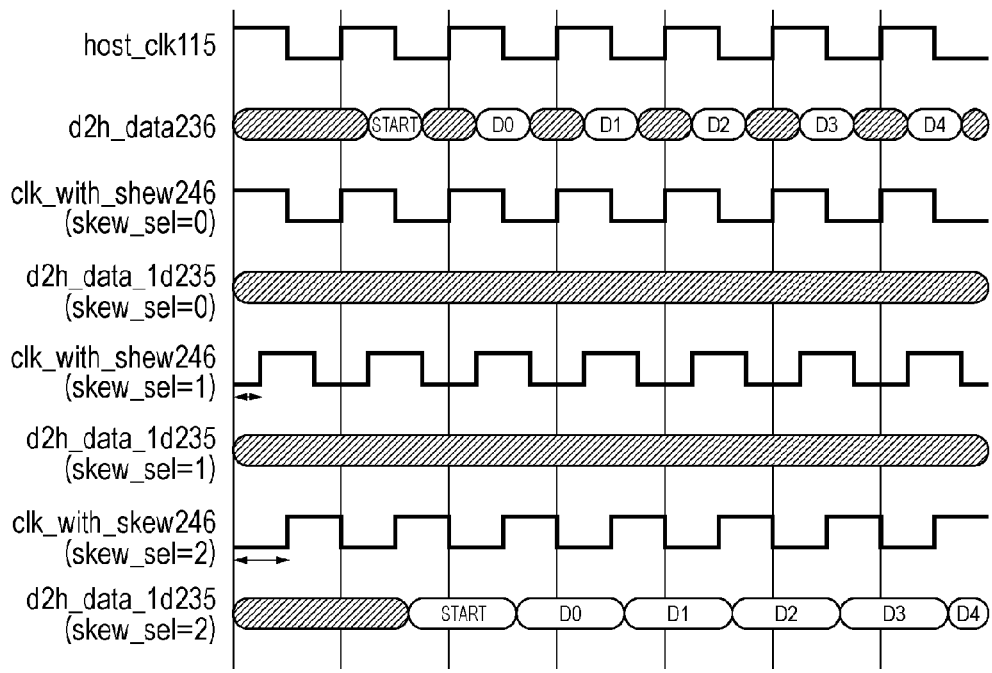
FIG. 2B is a timing chart of the skew control unit.

FIG. 2B illustrates a timing chart of signals handled by the skew control unit 211 when the skew set value is set to 0, 1, and 2. If the signals in FIG. 2B are made to correspond to the signs in FIGS. 1 and 2A, the host_clk 115, the dh2_data 236, the clk_with_skew 246 (skew_sel 238=0, 1, 2), and the d2h_data_1d 235 (skew_sel 238=0, 1, 2) are plotted in sequence from the top.

In the timing chart of FIG. 2B, when the skew selection value 238 (skew_sel) is 0 and 1, the d2h_data 236 is variable at a rising edge of the clk_with_skew 246. Therefore, the data d2h_data_1d 235 latched in the flip-flop 218 is also made variable, and normal data latch is not achieved. When the skew selection value 238 is 2, the d2h_data 236 exhibits stable output data at a rising edge of the clk_with_skew 246. Thus, the data d2h_data_1d 235 latched in the flip-flop 218 is also normal. The adjustment of the skew selection value 238 is performed using a calibration sequence described below.

Cycle Correction Configuration

Next, the details of a configuration for correcting a cycle delay will be described.

Figure 3A:
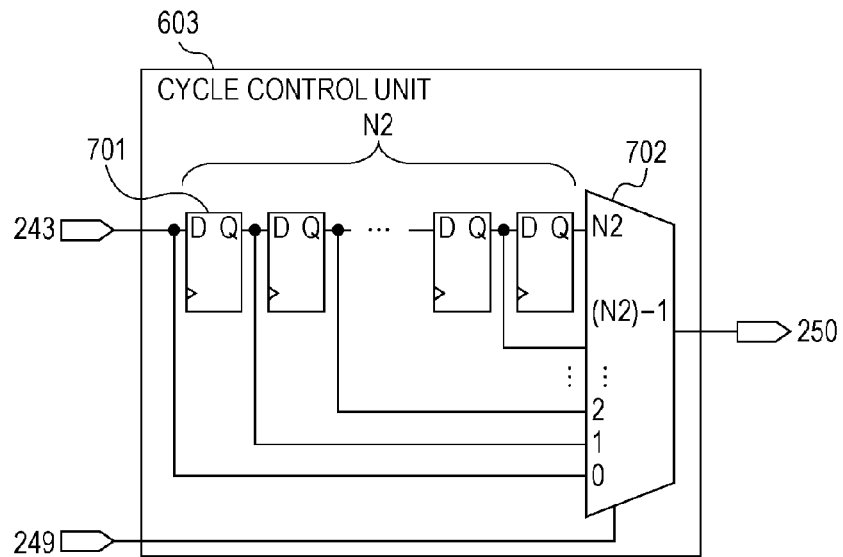
FIG. 3A is a configuration diagram of a cycle control unit.

FIG. 3A illustrates a schematic configuration of the cycle control unit 603. The cycle control unit 603 includes flip-flops 701 (second delay unit), the number of which is N2, the output of each flip-flop being connected in series with the input of the next flip-flop. Each of the flip-flops 701 delays the output clock enable signal 243 by one clock. The cycle control unit 603 causes the flip-flops 701 to delay the input output clock enable signal 243 by the number of cycles indicated by the cycle set value 256. The delayed output clock enable signal 243 is input to the received data SP conversion unit 210 as the reception enable signal 250.

Figure 3B:
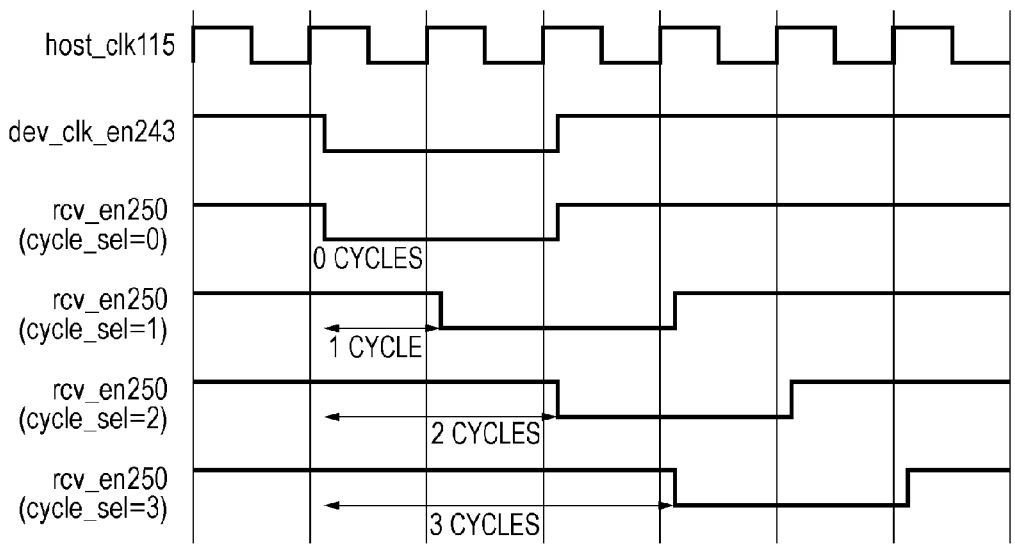
FIG. 3B is a timing chart of the cycle control unit.

FIG. 3B illustrates waveforms of various signals handled by the cycle control unit 603. In the description of the signals in FIG. 3B which are made to correspond to the signs in FIG. 1, the host_clk 115, the dev_clk_en 243, and the rcv_en 250 are plotted in sequence from the top. The cycle control unit 603 delays the input output clock enable signal 243 in accordance with the value of the cycle selection value 249 (cycle_sel=0, 1, 2, 3), and outputs the delayed output clock enable signal 243 as the reception enable signal 250. If the value indicated by the cycle selection value 249 is assumed to be 2, the cycle control unit 603 delays the output clock enable signal 243 by two cycles by selecting the output that has passed through two flip-flops 701 using a selector 702, and outputs a resulting signal as the reception enable signal 250. In the configuration of FIGS. 3A and 3B, since the N2 flip-flops 701 are present, the output clock enable signal 243 can be delayed by an integer multiple of one cycle (up to N2 cycles).

In this exemplary embodiment, the received data SP conversion unit 210 determines the data latch stop timing based on de-assertion of the reception enable signal 250, and determines the data latch resume timing when the reception enable signal 250 is asserted again.

The gating mode setting register 605 receives a gating mode register set value 247 (gate_reg) from the CPU I/F control unit 201, and holds the gating mode register set value 247. Further, the gating mode setting register 605 outputs the received gating mode register set value 247 to the output clock control unit 213 as a gating mode set value 251 (gate_mode).

Here, the gating mode of the external device controller 103 in this exemplary embodiment includes two modes: a calibration mode and a normal data transfer mode. The gating pattern setting register 606 receives a gating pattern register set value 248 (pattern_reg) from the CPU I/F control unit 201, and holds the gating pattern register set value 248. Further, the gating pattern setting register 606 outputs the received gating pattern register set value 248 to the output clock control unit 213 as a gating pattern 252 (gate_pattern).

The gating pattern register set value 248 is information for generating a clock gating pattern (gating information), and indicates how clock gating is performed. (More specifically, the information is information indicating L, N, S, and E described below in FIG. 5.)

Figure 4A:
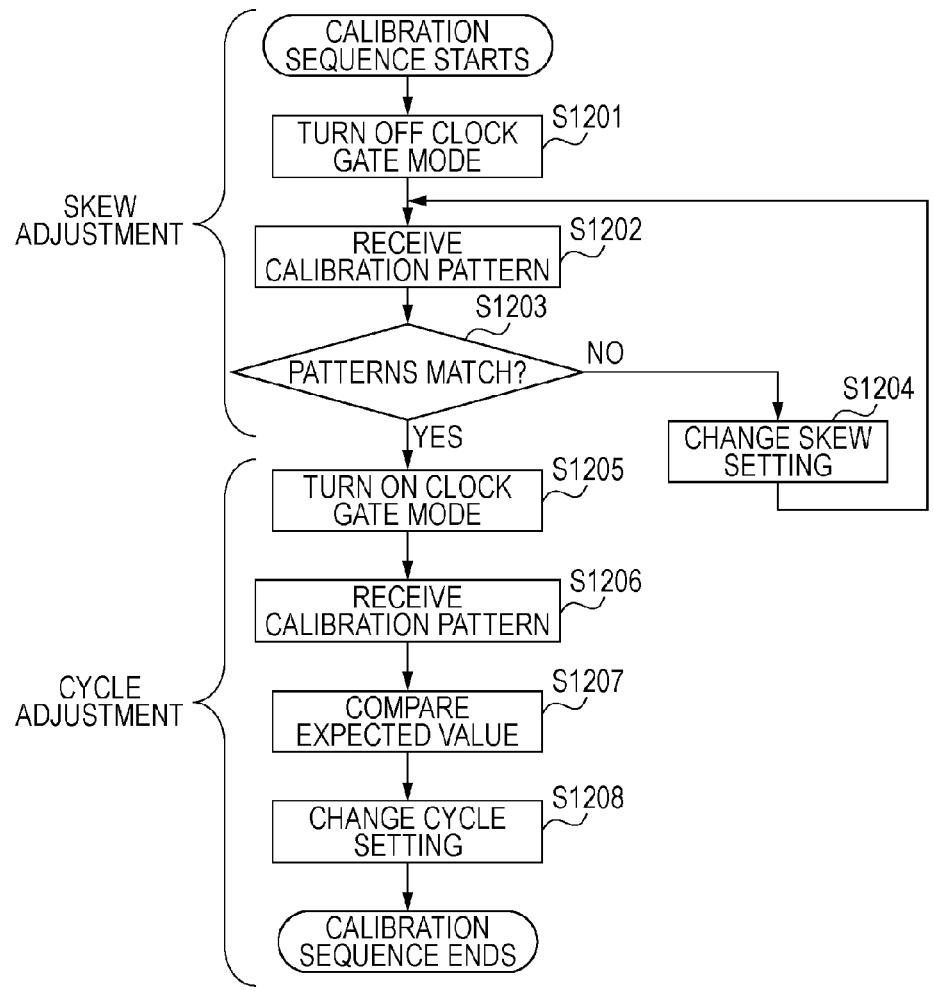
FIG. 4A is a flowchart of a calibration process.
Figure 4B:
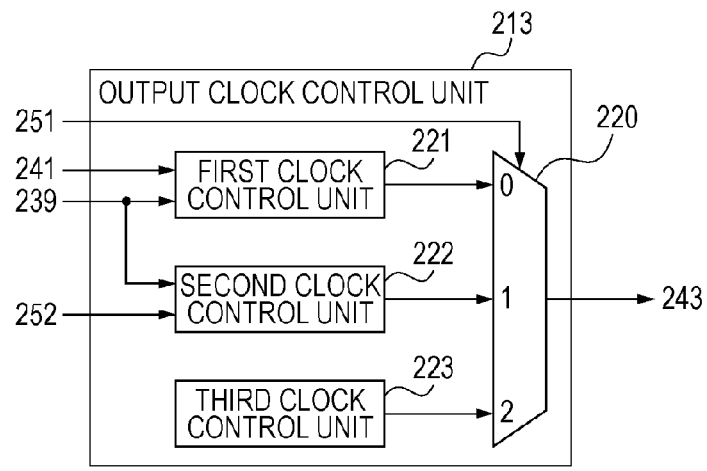
FIG. 4B is a configuration diagram of an output clock control unit.

FIG. 4B illustrates the configuration of the output clock control unit 213 which serves as a selection unit in this exemplary embodiment. A first clock control unit 221 (first control unit) receives the reception buffer full signal 241 and the reception status signal 239, and performs clock control similar to that described in PTL 1. A second clock control unit 222 (second control unit) performs clock control described below (first clock control mode) on the basis of the reception status signal 239 and the gating pattern 252. Further, a third clock control unit 223 (third control unit) performs control so as to generate the output clock enable signal 243 for performing control to output the host clock 115 of the external device controller 103 without stopping the supply of the host clock 115 (second clock control mode).

First, the received data SP conversion unit 210 adds information indicating a reception state such as how many bits in the received data 236 have been received thus far to the reception status signal 239, and transmits the resulting reception status signal 239 to the output clock control unit 213. The second clock control unit 222 determines how many bits the received data SP conversion unit 210 has received on the basis of the reception information added to the reception status signal 239. If the gating pattern 252 does not meet a condition indicating that gating is performed, the output clock enable signal 243 is generated.

A clock control selection unit 220 is a selector, and causes one of the first clock control unit 221, the second clock control unit 222, and the third clock control unit 223 to selectively function in accordance with the set value indicated by the gating mode set value 251 from the gating mode setting register 605.

Command/Data Format

Here, the format of signals used to send and receive commands and data between the external device controller 103 and the external device 107 will be described.

Figure 21A:
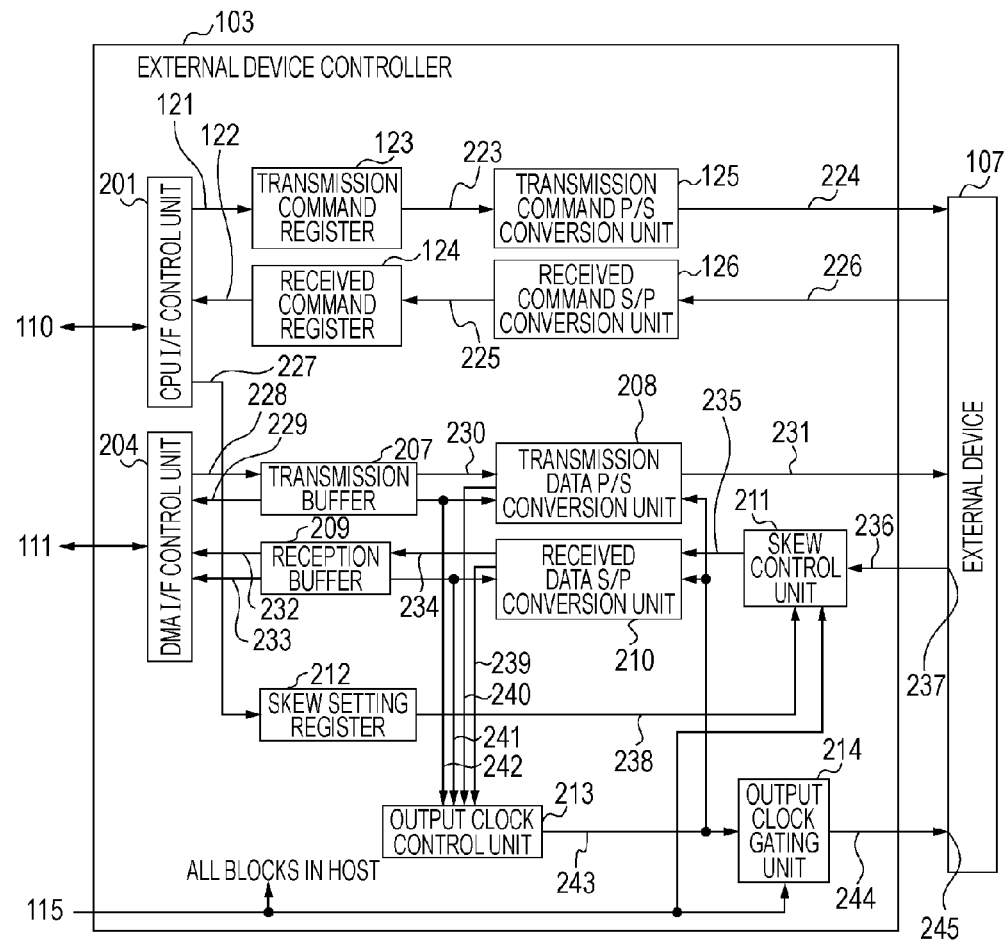
FIG. 21A illustrates the configuration of the external device controller.
Figure 21B:
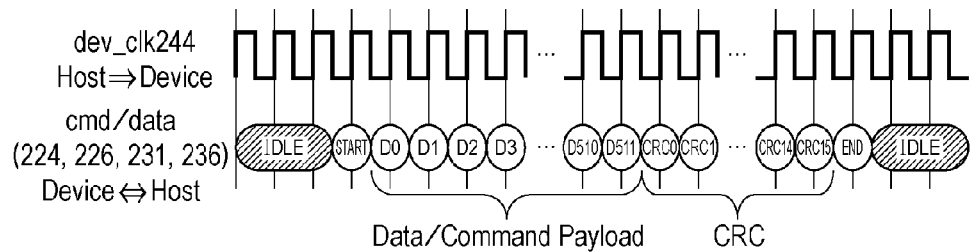
FIG. 21B is a timing chart illustrating the format of commands or data.

The external device controller 103 and the external device 107 mutually exchange serial format commands or serial format data in a format illustrated in FIG. 21B. In the following description, it is assumed that both parallel format commands and parallel format data have a similar format.

First, signals handled when the serial format transmission command 224 and the serial format received command 226 are transmitted and received will be described with reference to FIG. 21B. The transmission command 224 is composed of a 1-bit start bit, an N-bit transmission command, an M-bit cyclic redundancy check (CRC), and a 1-bit end bit. Upon detection of reception of the parallel format transmission command 223, first, the transmission command PS conversion unit 125 transmits the 1-bit start bit. Subsequently, the N-bit parallel format transmission command 223 is converted into a serial format transmission command 224, and the serial format transmission command 224 is transmitted. The transmission command PS conversion unit 125 computes a CRC in addition to the transmission of the serial format transmission command 224. After the serial format transmission command 224 is transmitted, the computed M-bit CRC is transmitted Finally, the 1-bit end bit is transmitted, and command transmission is completed.

The serial format received command 226 also has the format as illustrated in FIG. 21B. However, since a received command and a transmission command need not match each other, the received command and the transmission command may have different command lengths or CRC lengths.

The received command SP conversion unit 126 detects the 1-bit start bit, and starts receiving a command. Subsequently, the N-bit serial format received command is received and is converted into a parallel format received command. The received command SP conversion unit 126 computes a CRC in addition to the reception of the serial format received command. After the serial format received command is received, the computed CRC is compared with an M-bit CRC to be delivered (cyclic redundancy check), and a CRC error is detected. Finally, the 1-bit end bit is received, and command reception is completed.

Upon receipt of parallel format transmission data 230 (s_data_buf) from the transmission buffer 207, like the transmission command PS conversion unit 125, the transmission data PS conversion unit 208 converts the parallel format transmission data 230 into serial format transmission data 231 (h2d_data), and transmits the serial format transmission data 231 to the external device 107. The length of transmission data or the length of a CRC may be different from those in a transmission command.

The received data has the format as illustrated in FIG. 21B. However, the length of received data and the length of a CRC may be different from those in a transmission command.

Upon detection of the 1-bit start bit, the received data SP conversion unit 210 starts reception of data. Then, the received data SP conversion unit 210 performs processing in a manner similar to that of the received command SP conversion unit 126 to convert the serial format skew-adjusted received data 235 into parallel format received data 234, and transmits the parallel format received data 234 to the reception buffer 209. The CRC computation process and comparison process of the transmission data PS conversion unit 208 and the received data SP conversion unit 210 are similar to the processes of the transmission command PS conversion unit 125 and the received command SP conversion unit 126, and the description thereof is thus omitted.

Calibration

Next, a calibration process for adjusting various parameters (skew set value, cycle set value) so that the external device controller 103 can correctly latch data therein will be described.

Figure 22:
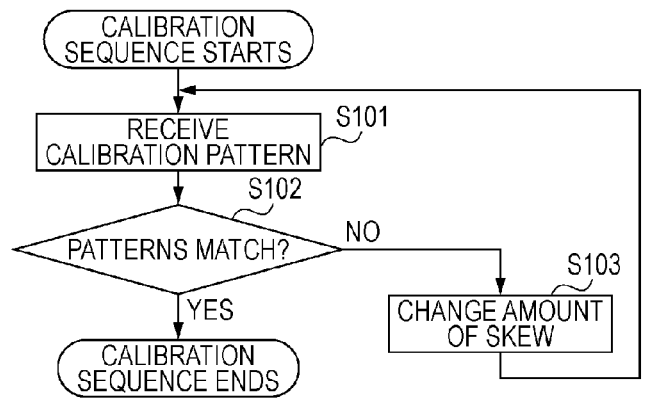
FIG. 22 is a flowchart of a calibration process.

First, a calibration flow in the external device controller 103 having the configuration illustrated in FIG. 21A will be described using FIG. 22.

First, in step S101, in response to an instruction for starting calibration from the CPU 101, the external device controller 103 transmits to the external device 107 a transmission command for causing the external device 107 to output a calibration pattern. Then, the external device 107 transmits a reception command to the external device controller 103 in response to the transmission command for calibration. Further, the external device 107 transmits a predetermined calibration pattern to the external device controller 103 in place of the serial format received data 237. The external device controller 103 receives the calibration pattern in accordance with the data receiving flow described above. The received calibration pattern is written in the DRAM 106 through the DMA controller 102 and the DRAM controller 104.

After all the calibration patterns have been written in the DRAM 106, in step S102, the CPU 101 compares an actually received calibration pattern with a calibration pattern stored in advance as an expected value in the DRAM 106 or the like. If the CPU 101 determines that both calibration patterns match, it can be considered that the skew setting is correct. Thus, the calibration sequence is completed. If both calibration patterns do not match, it can be considered that the skew setting is wrong. Thus, in step S103, the CPU 101 sets a different skew set value 227 in the external device controller 103, and performs the calibration sequence (S101, S102) again. The above process is repeatedly performed until calibration succeeds.

Here, it is assumed that calibration patterns are stored in advance on the external device 107 side and that the external device 107 transmits a stored calibration pattern upon receipt of a command for starting calibration.

Figure 23:
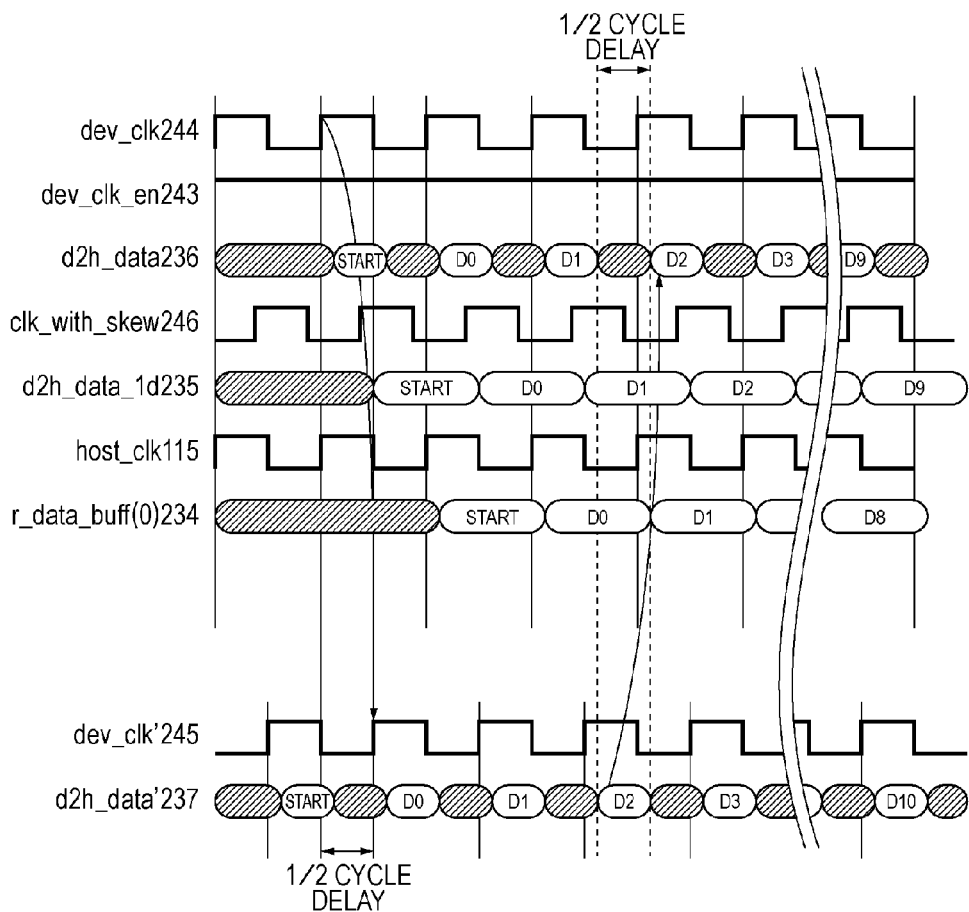
FIG. 23 is a timing chart of a calibration process.

Here, a waveform of a signal handled in step S101 when the skew adjustment is completed will be described. FIG. 23 illustrates waveforms in the calibration sequence when the received data 236 has a delay of one cycle or more. Here, the case where the received data 236 has a delay of one cycle or more may be the case where a wire delay of ½ cycles or more has occurred between the external device controller 103 and the external device 107. In the description of the signals in FIG. 23 which are made to correspond to the signs in FIGS. 21A and 2A, the dev_clk 244, the dev_clk_en 243, the d2h_data 236, the clk_with_skew 246, the d2h_data__1d 235, the host_clk 115, the r_data_buff 234, the dev_clk' 245, and the d2h_data' 237 are plotted in sequence from the top. There is a difference in timing between the latch clock and latched data, which indicates a delay until data is latched in a flip-flop in the case of latching in an actual circuit with reference to an edge of a clock. This delay may be caused in a portion that is not directly related to the problems to be addressed by the present invention, and the amount of delay is small. Therefore, if received data is delayed by one cycle or more, the delay may be ignored (excluded). Further, in FIG. 23, a portion of waveforms during the last half of the calibration is not illustrated.

In the example of FIG. 23, the clock 245 (dev_clk') input to the external device 107 is delayed by ½ cycles with respect to the output clock 244 (dev_clk) output from the external device controller 103. Further, the received data 236 (d2h_data) received by the external device controller is delayed by ½ cycles with respect to the received data 237 (d2h_data') transmitted from the external device 107.

The above delays are considered to be caused by a reciprocating delay on a substrate between the external device 107 and the external device controller 103, an output delay in the external device 107, a delay in the external device controller 103, or the like. As a result, in the example of FIG. 23, the received data 236 latched in the external device controller 103 as data output from the external device 107 in response to the output clock 244 of the external device controller 103 includes a delay of one cycle.

The size of the calibration pattern is generally much smaller than the size of the reception buffer 209. Thus, the external device controller 103 in the configuration illustrated in FIG. 21A does not stop supply of output clocks during calibration. Even if the size of the calibration pattern is larger than the size of the reception buffer 209, whether supply of output clocks is to be stopped may depend on the transfer rate or the like of the DMA controller 102. Therefore, a situation may be less likely to occur in which the supply of the output clock 244 is stopped during calibration.)

Referring to FIG. 23, since the content of the r_data_buff (0) 234 coincides with the content of the input serial format received data d2h_data 236, the calibration process is completed. However, as illustrated in FIG. 24, when data is actually received, failure to latch the data or the like may occur.

Figure 24:
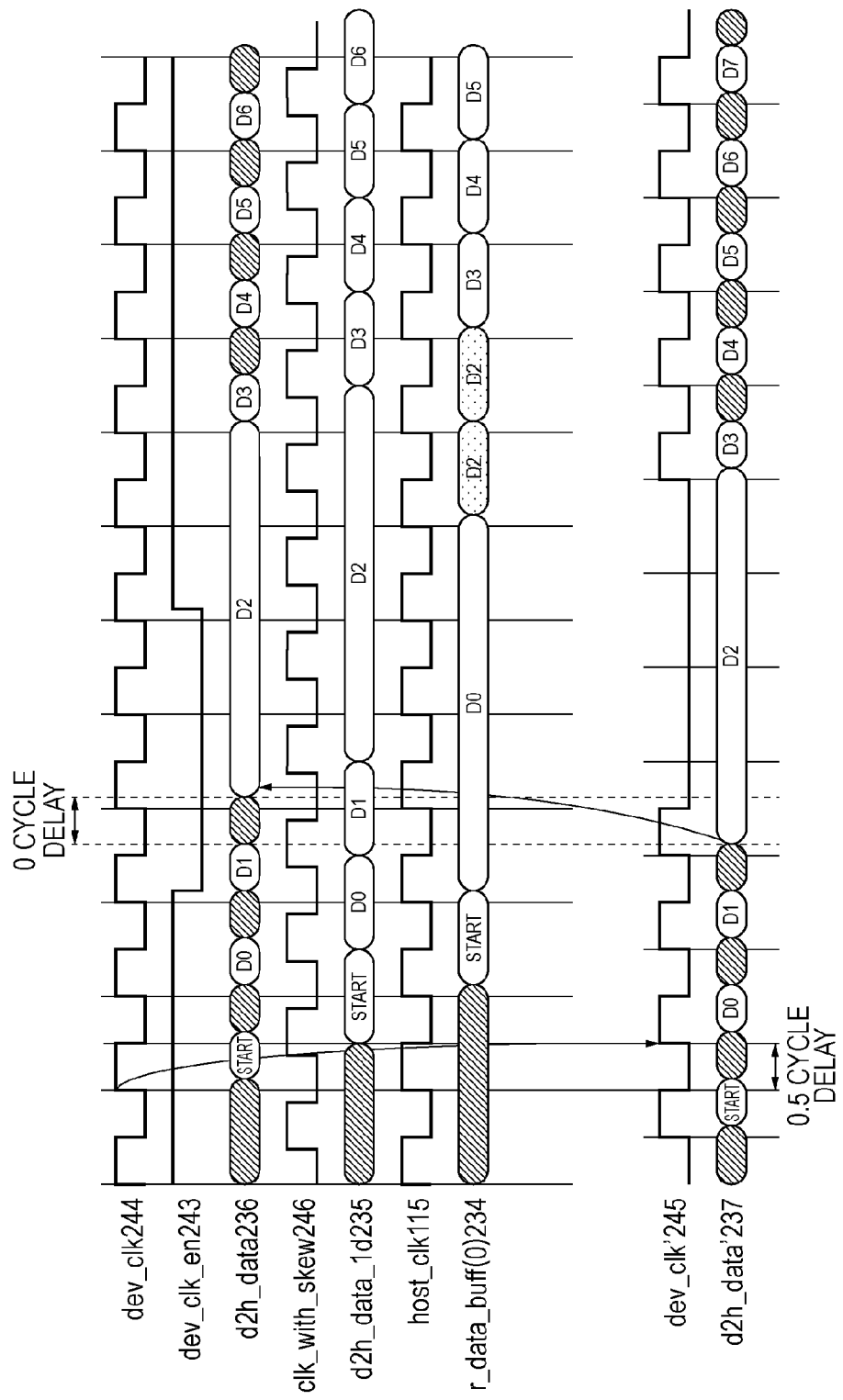
FIG. 24 is a timing chart of signals handled by the external device controller.

A timing chart of FIG. 24 illustrates waveforms of signals when the external device controller 103 actually receives data from the external device 107 in a case where, as in FIG. 23, the received data 236 has a delay of one cycle. Since the correspondence between the signals illustrated in FIG. 24 and those in FIGS. 21A and 2A is similar to that in FIG. 23, the descriptions thereof will be omitted.

In FIG. 24, at the time when "D0" in the serial format received data 236 is received, a situation occurs in which the reception buffer full signal 241 (not illustrated in FIG. 24) of the reception buffer 209 is asserted. In accordance with the assertion of the reception buffer full signal 241, the output clock control unit 213 de-asserts the output clock enable signal 243 (dev_clk_en). In response to the de-assertion of the output clock enable signal 243, the output clock gating unit 214 gates the output clock 244. Although the output clock 244 is gated by the output clock gating unit 214, serial format received data "D1" and "D2" are transmitted from the external device 107.

Initially, data input to the reception buffer 209 (based on which the reception buffer full signal 241 is issued) is delayed by ½ cycles at the time when the data is input from the external device 107 to the external device controller 103. After the reception buffer full signal 241 is asserted, in addition to a delay until the output clock 244 is gated, a delay of ½ cycles occurs until the external device 107 is capable of recognizing that the output clock 244 has been gated. Consequently, there is a delay equal to the sum of the above delays until the external device 107 recognizes the request made by the external device controller 103 that data transmission be stopped, and therefore "D1" and "D2" are transmitted.

In response to the de-assertion of the output clock enable signal 243, the received data SP conversion unit 210 immediately stops receiving the serial format received data 236. Thus, the received data SP conversion unit 210 can no longer receive the serial format received data "D1". As illustrated in FIG. 24, the parallel format received data 234 received by the received data SP conversion unit 210 and transmitted to the reception buffer 209 does not include "D1".

Further, after the reception buffer full signal 241 of the reception buffer 209 is deasserted, the output clock enable signal 243 is asserted and the gating of the output clock 244 is released. Since the gating is performed based on a falling edge, the output clock 244 rises ½ cycles after the release of gating. However, although the gating of the output clock 244 has been released, due to the delay between the external device 107 and the external device controller 103, the serial format received data "D2" continues to be transmitted from the external device 107.

In the meantime, in response to the assertion of the output clock enable signal 243, the received data SP conversion unit 210 immediately resumes receiving serial format received data. This causes the received data SP conversion unit 210 to receive the serial format received data "D2" twice. It can be seen from the parallel format received data 234 that D2 has been received twice.

In this manner, if there is a reciprocating delay of one cycle or more between the external device controller 103 and the external device 107, the configuration illustrated in FIG. 21A may allow completion of calibration (FIG. 23), but may cause failure of actual data reception (FIG. 24).

It can be seen from the above that the external device controller 103 illustrated in FIG. 21A may fail to detect the presence or absence of a delay of one cycle or more that may occur in the received data 236 in the calibration sequence.

The time scale in FIG. 24 is based on the assumption that, for convenience of description, the period from when the reception buffer full signal 241 is asserted to when the reception buffer full signal 241 is de-asserted is extremely short and the reception buffer 209 is extremely small, for ease of description.

Next, a calibration flow of this exemplary embodiment will be described with reference to FIG. 4A. In the calibration flow of this exemplary embodiment, first, skew adjustment is performed while causing the third clock control unit 223 to function, and then cycle adjustment is performed while causing the second clock control unit 222 to function. If it is known that the size of the calibration pattern is sufficiently smaller than the size of the reception buffer 209 and that no clock gating occurs during reception of the calibration pattern, the first clock control unit 221 may be used instead of the third clock control unit 223.

Here, the term "skew adjustment" means adjustment in which the shift in phase (phase shift) between the host clock 115 and the received data 236 is corrected using the configuration illustrated in FIG. 2A. The term "cycle adjustment" means adjustment in which a period-to-period shift between the host clock 115 and the received data 236 is corrected using the configuration illustrated in FIG. 3A. In the following description, a cycle shift (corresponding to a shift in the data latch timing or a shift in the data latch resume timing) is called the number of delay cycles (amount of cycle delay).

First, a skew adjustment flow will be described. In step S1201, the CPU 101 sets the clock gating mode of the external device controller 103 to a calibration mode in which the supply of clocks is not stopped (a mode in which the third clock control unit 223 is used). In step S1202, the CPU 101 instructs the external device controller 103 to acquire the calibration pattern. The calibration pattern acquisition process performed by the external device controller 103 is similar to that performed by the configuration illustrated in FIG. 21A. When the acquisition of the calibration pattern is completed, in step S1203, the CPU 101 compares the actually received calibration pattern with a calibration pattern read from a read-only memory (ROM) or a random access memory (RAM) as a calibration pattern to be received. If a match is found as a comparison result, it can be considered that the skew setting is correct. Thus, the skew adjustment flow ends.

If no match is found as a comparison result, it can be considered that the skew setting is wrong. In this case, in step S1204, the CPU 101 changes the value of the skew setting register 212 to change the skew setting, and then proceeds to step S1202. The skew setting is changed, and the processing of steps S1202 and S1203 is repeatedly performed until patterns match in step S1203.

Subsequently, a cycle adjustment flow will be described. In step S1205, the CPU 101 sets the clock gating mode of the external device controller 103 to a calibration mode in which the supply of clocks is stopped in accordance with the value indicated by the reception status signal 239 and the gating pattern 252 (a mode for causing the second clock control unit 222 to function). Further, the CPU 101 sets a gating pattern register set value 248 in the external device controller 103. In step S1206, the CPU 101 instructs the external device controller 103 to acquire the calibration pattern. An overview of the calibration pattern acquisition process performed by the external device controller 103 is similar to that performed by the configuration illustrated in FIG. 21A.

However, the output clock control unit 213 of this exemplary embodiment issues the output clock enable signal 243 in accordance with the gating pattern 252. Then, the output clock gating unit 214 gates the output clock 244 in accordance with the output clock enable signal 243 during reception of the calibration pattern. When the cycle computation unit 602 completes the acquisition of the calibration pattern in step S1206, the process proceeds to step S1207. Then, in step S1207, the cycle computation unit 602 compares the actually received calibration pattern with an expected value that is read by the CPU 101 from the DRAM 106 or the like as a calibration pattern to be received and that is stored in the expected value setting register 604. The actually received calibration pattern may differ depending on the gating pattern, the calibration pattern (expected value), and the difference between the current cycle set value and the actual delay cycle. The details will be described below.

FIG. 20 illustrates an example in which "01010101" is used as the calibration pattern. Although the details will be described below, if the current cycle set value and the actual number of delay cycles match, the external device controller 103 can receive the calibration pattern like "01010101". However, if the actual number of delay cycles is larger than the current calibration pattern by one cycle, the calibration pattern like "01011101" is received. In this case, the cycle computation unit 602 compares the calibration pattern received through the process described above with the calibration pattern to be received (expected value), and detects the presence or absence of a delay. If a delay is present, the actual number of delay cycles is detected using the calibration pattern obtained when a delay occurs (see FIG. 20). In S1208, the cycle computation unit 602 (or the CPU 101) sets the detected actual number of delay cycles as a cycle set value, and completes the cycle adjustment flow. When the calibration sequence ends, the output clock control unit 213 switches the mode to the third clock control mode to prepare for transmission and reception of data.

As described above, if the size of the calibration pattern is made smaller than the size of the reception buffer 209, the reception buffer 209 does not become full during the calibration sequence. However, the external device controller 103 of this exemplary embodiment gates the output clock 244 in accordance with the gating pattern regardless of the assertion of the reception buffer full signal 241. If the cycle setting or the skew setting is wrong, the wrong calibration pattern is acquired as it is (so as to allow recognition that the calibration has not succeeded). After calibration is completed using the flow illustrated in FIG. 4A, in order to switch the mode to a mode in which the first clock control unit 221 is used, the CPU 101 performs setting so as to cause the gating mode setting register 605 to store "0" in the clock control selection unit 220, and prepares for transmission and reception of data.

With the above process, even if a delay of one clock cycle or more occurs in the received data 236, the external device controller 103 in this exemplary embodiment can detect the presence or absence of the delay. Thus, various parameters (skew setting, cycle setting) for transmitting and receiving data without failure to latch the data can be set.

Further, as illustrated in FIG. 4A, a delay between cycles is adjusted while clock gating is performed based on a gating pattern after a delay in a cycle is adjusted using skew adjustment without performing clock gating, thus allowing efficient calibration. In this manner, if skew adjustment and cycle adjustment are not separated, it is necessary to receive and compare calibration patterns in a round-robin manner (up to N1×N2 times) until the expected value and the received data 236 match, and a considerable amount of time may be required for the calibration process.

Further, if the size of the calibration pattern is sufficiently smaller than the size of the reception buffer 209, skew adjustment may be performed using the first clock control unit 221 instead of the third clock control unit 223 in steps S1201 to S1204 of FIG. 4A. This is because no clock gating occurs even if the first clock control unit 221 is used during reception of the calibration pattern. Even in this case, with the processing of steps S1205 to S1208, calibration is easier to succeed than that in the configuration illustrated in FIG. 21A. That is, the number of times calibration is performed can be reduced.

Calibration Pattern and Gating Pattern

Here, the correlation between a calibration pattern and a gating pattern will be described. When the calibration process is completed, it is assumed that the number of cycles indicated by the cycle set value 256 coincides with the number of cycles actually delayed. In the example of FIG. 24, since the cycle delay is one cycle, the value indicated by the correct cycle set value 256 to be set is "1". The waveforms illustrated in FIG. 24 correspond to those when the cycle set value 256 is not subjected to cycle adjustment.

Appropriate setting of the gating pattern and calibration pattern of the output clock 244 may increase the accuracy of the calibration process accordingly. For example, in the example of FIG. 24, the received data "D1" is not receivable, and the received data "D2" has been received twice instead. In this manner, replacement of data occurs. Thus, if the comparison with the received data 236 is performed using an undesirable calibration pattern (a pattern without consideration of viewpoints described below), the number of times the reception and comparison of the calibration pattern are performed may be increased, or the risk of reduced accuracy of the process can possibly be increased. For example, in skew adjustment and cycle adjustment, it is necessary to perform comparison in a round-robin manner (up to N1+N2 times) until the expected value and the received data 236 match.

In the following, the correlation between the gating pattern and the calibration pattern of the output clock 244 will be described with respect to four viewpoints. With the use of a calibration pattern with consideration of these viewpoints, the time for comparison in the calibration process can be reduced (up to N1+1 times).

The gating pattern may be set in accordance with the calibration pattern and the following four viewpoints. With the use of the gating pattern for calibration, if a control signal for stopping the data latch control of the received data SP conversion unit 210 (the output clock enable signal 243) is not delayed by an amount of cycle delay, it is possible to cause redundant reception or failure to latch data that is actually received by the external device controller 103 (the received data 234). FIG. 20 illustrates the correlation between the amount of cycle delay and the pattern that is received by the received data SP conversion unit 210 (the received data 234) in a situation where a desired gating pattern ("01010101" by way of example) is set.

(1) Correlation Between the Difference Between the Actual Amount of Delay and a Cycle Set Value (Hereinafter, Referred to as a "delay index M") and a Calibration Pattern that is Received The correlation between the delay index M and a calibration pattern that is received will be described, where delay index M=(actual amount of delay)−(cycle set value). Here, the term "actual amount of delay" is the number of cycles by which the received data 236 is delayed with respect to the output clock 244 when the cycle set value is "0" (corresponding to the case where skew adjustment has been performed and cycle adjustment is not performed).

Figure 6:
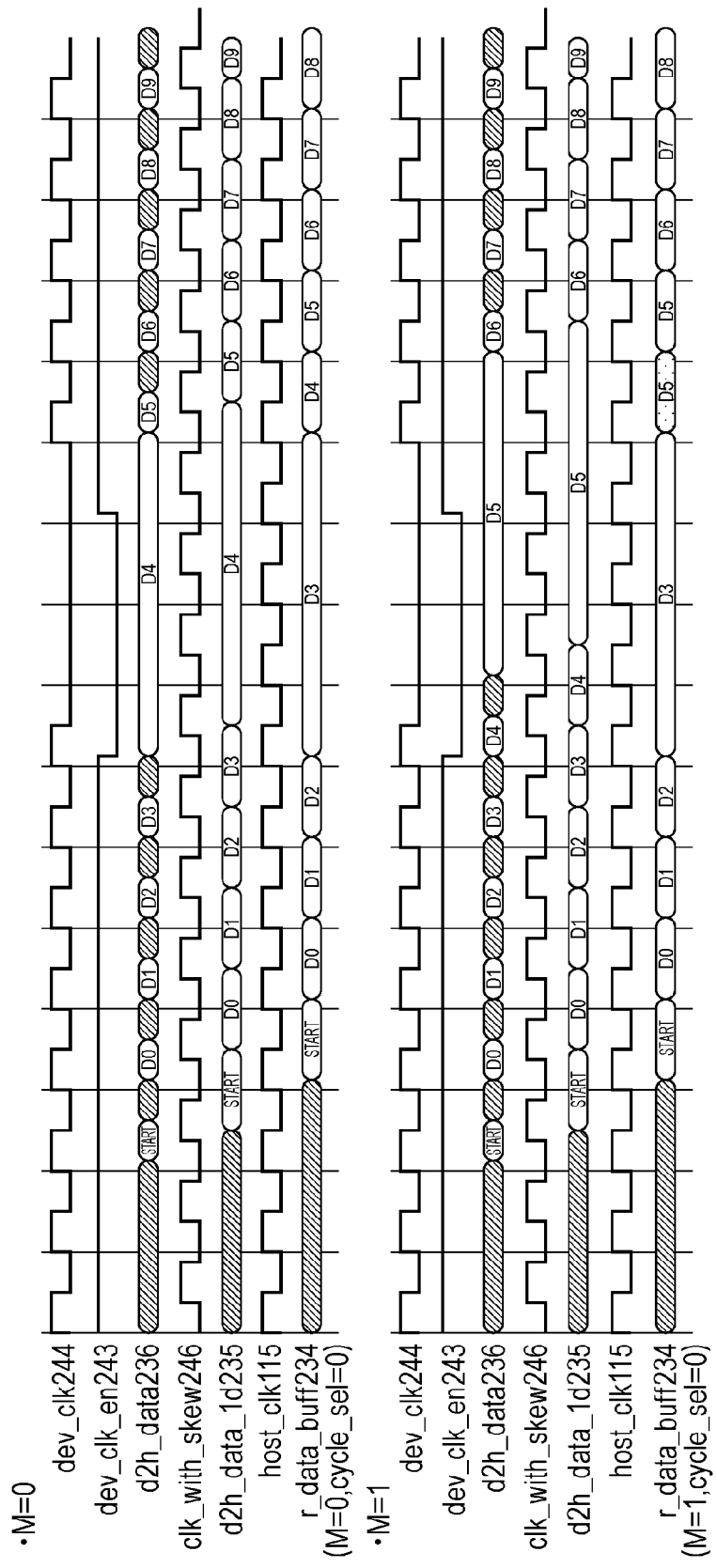
FIG. 6 is a timing chart illustrating the correlation between a cycle index and a calibration pattern that is received.
Figure 7:
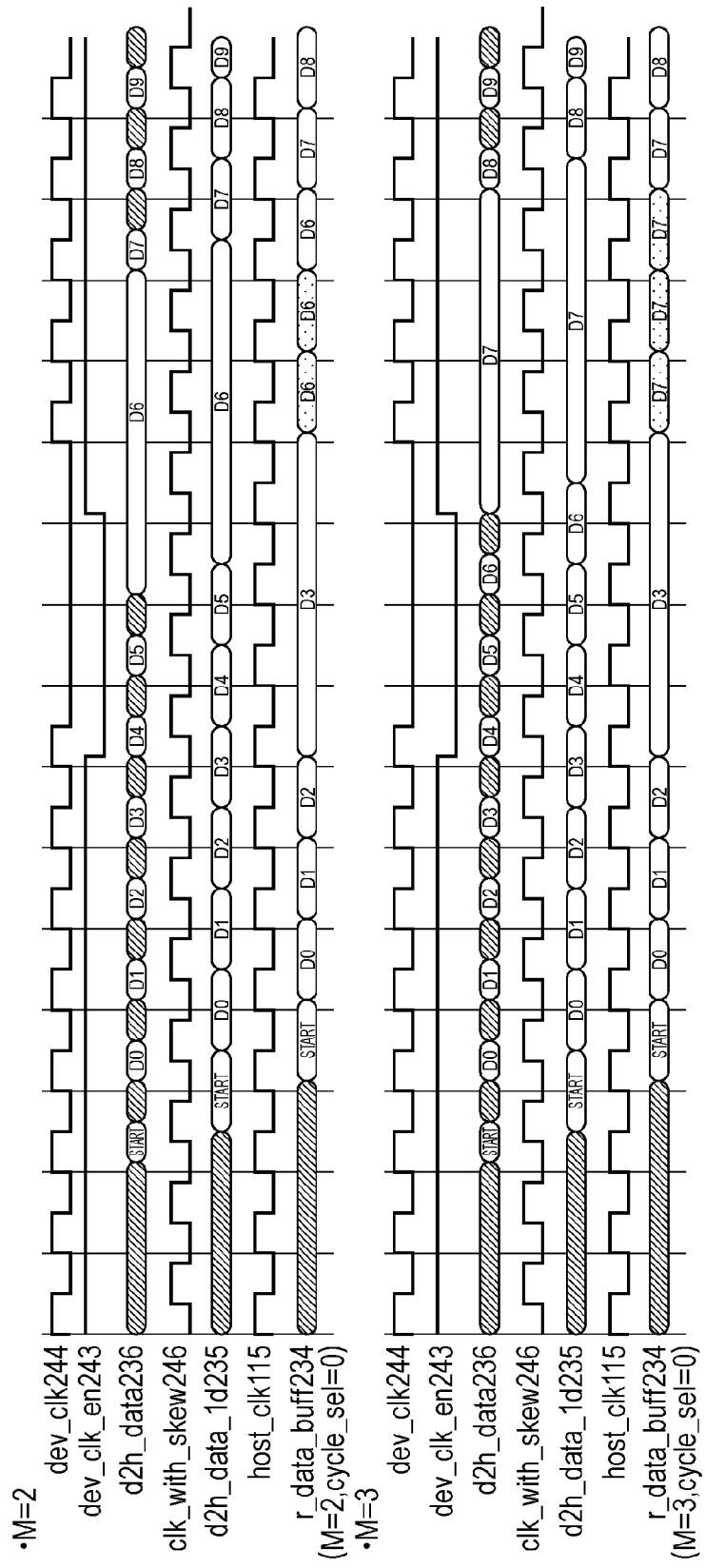
FIG. 7 is a timing chart illustrating the correlation between a cycle index and a calibration pattern that is received.

FIGS. 6 and 7 illustrate waveforms of the parallel format received data 234 when the change timing of the reception enable signal 250 is fixed to a timing without any delay and when the actual amount of delay is changed. If the signals in FIGS. 6 and 7 are made to correspond to the signs in FIG. 1 in sequence from the top, the dev_clk 244, the dev_clk_en 243, the dh2_data 236, the host_clk 115, the rcv_en 250, and the r_data_buff 234 are plotted. Further, FIGS. 6 and 7 illustrate four sets when the delay index M is 0, 1, 2, and 3.

In FIGS. 6 and 7, the gating of the output clock enable signal 243 is performed at the time when D3 is received, and the output clock 244 is de-asserted. As illustrated in FIGS. 6 and 7, the calibration pattern that is received (corresponding to the dh2_data 236) differs depending on the delay index M. When the delay index satisfies M>1, the range from the data after one cycle to the data after M cycles with respect to the data received at the time when gating is started (in the example of FIGS. 6 and 7, D3) is replaced by the data after M+1 cycles. When M=0 holds, the actual amount of delay matches the cycle set value, and a correct pattern has been received.

(2) Correlation Between the Amount of Gating (N) and a Pattern that is Received

Figure 5:
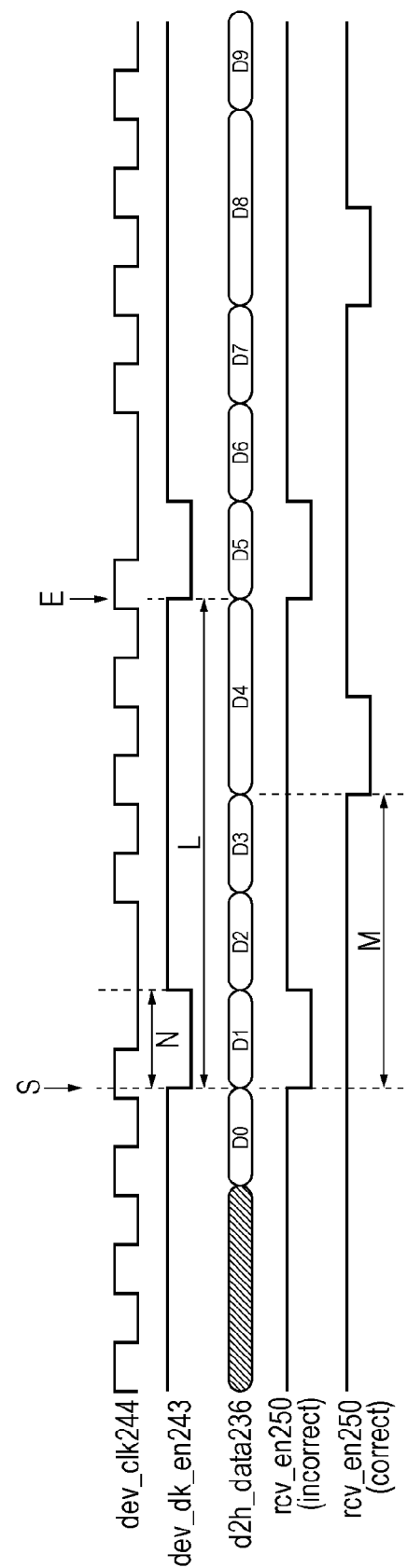
FIG. 5 is a timing chart of gating of an output clock based on a gating pattern during reception of a calibration pattern.

The correlation between N and a calibration pattern that is received (in a case where skew adjustment has been performed and cycle adjustment is incorrect) will be described, where N is the amount of gating representing the number of cycles during which the gating of the output clock 244 continues (for the definition of N, see FIG. 5).

Figure 8:
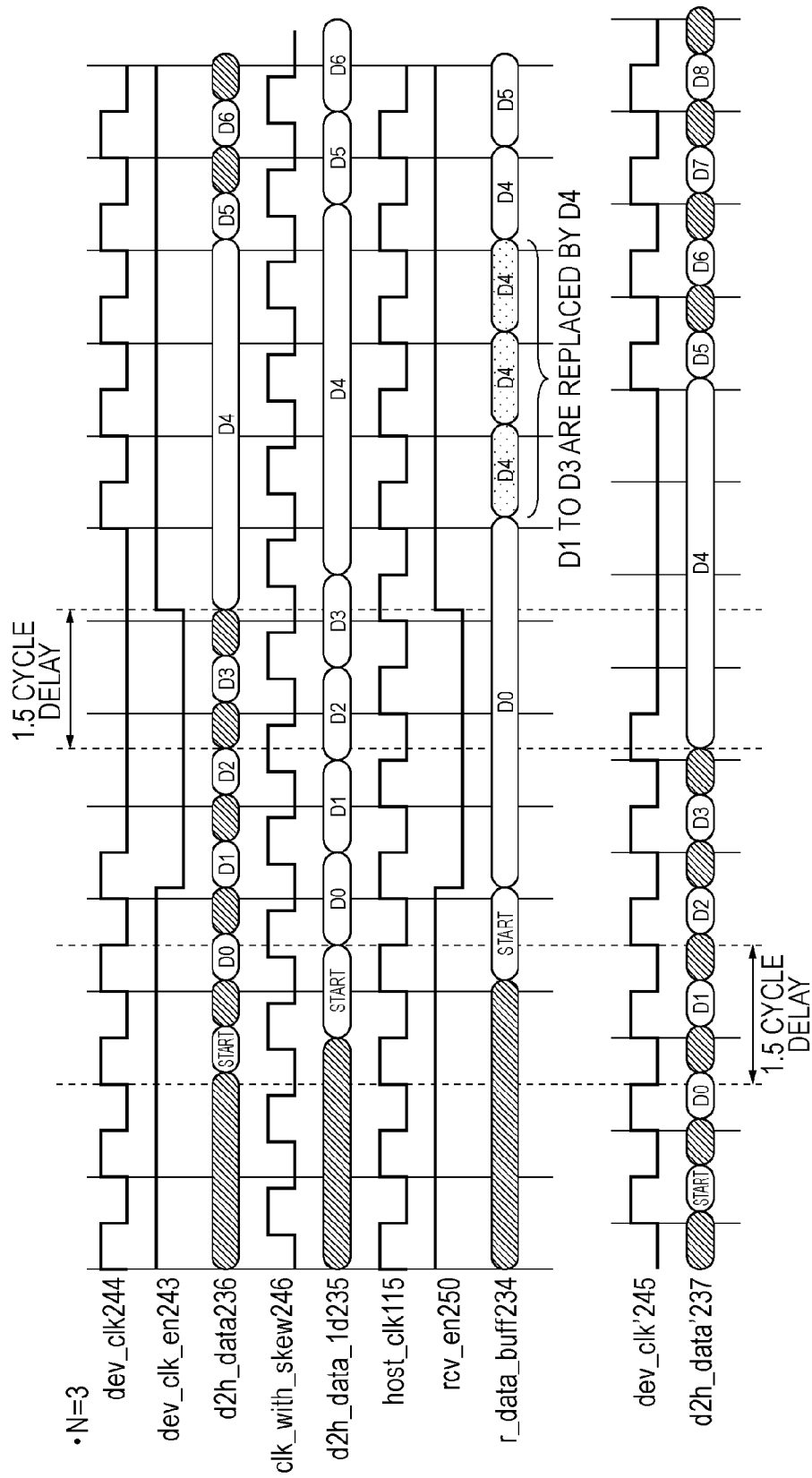
FIG. 8 is a timing chart illustrating the correlation between the number of gating cycles and a calibration pattern that is received.
Figure 9:
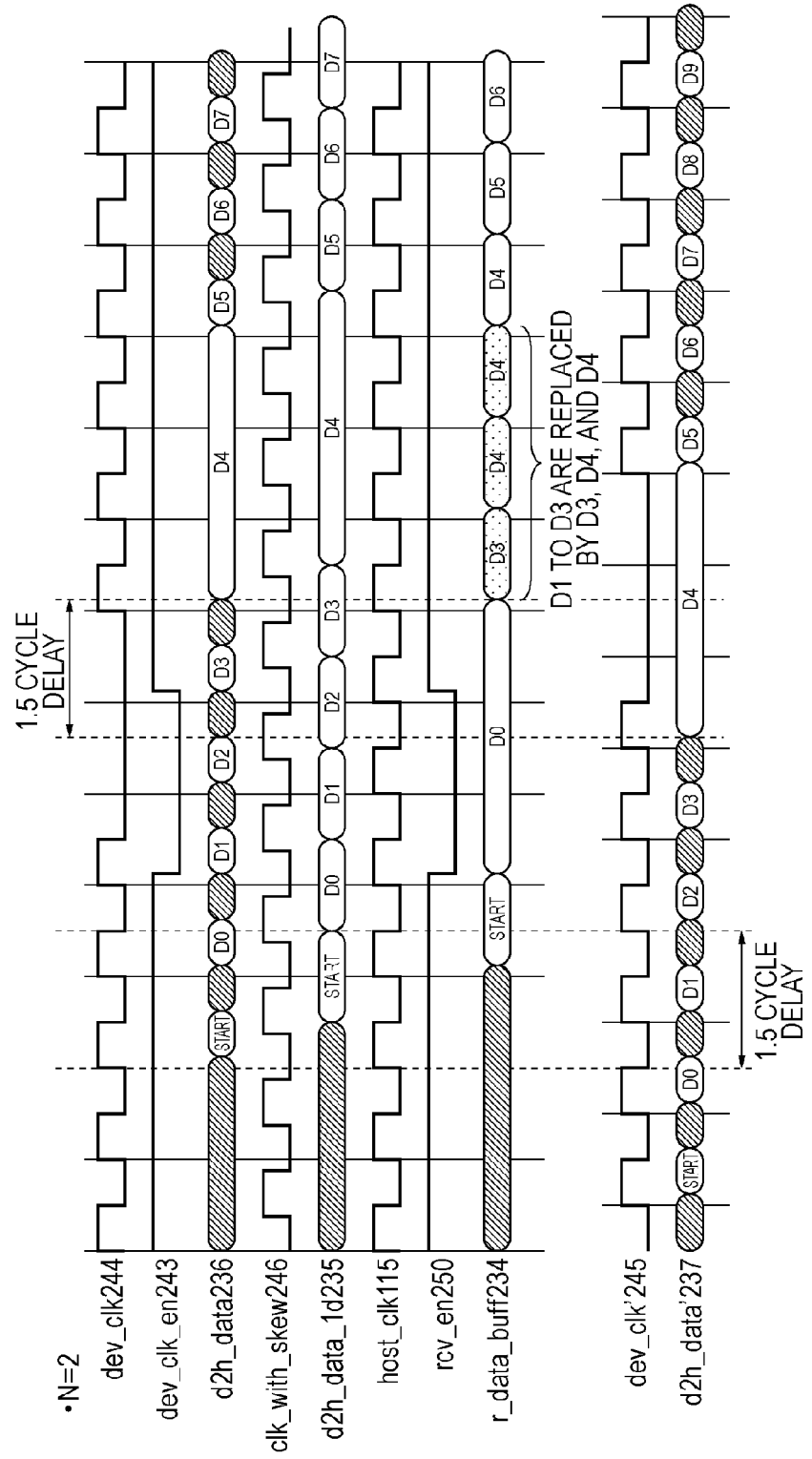
FIG. 9 is a timing chart illustrting the correlation between the number of gating cycles and a calibration pattern that is received.
Figure 10:
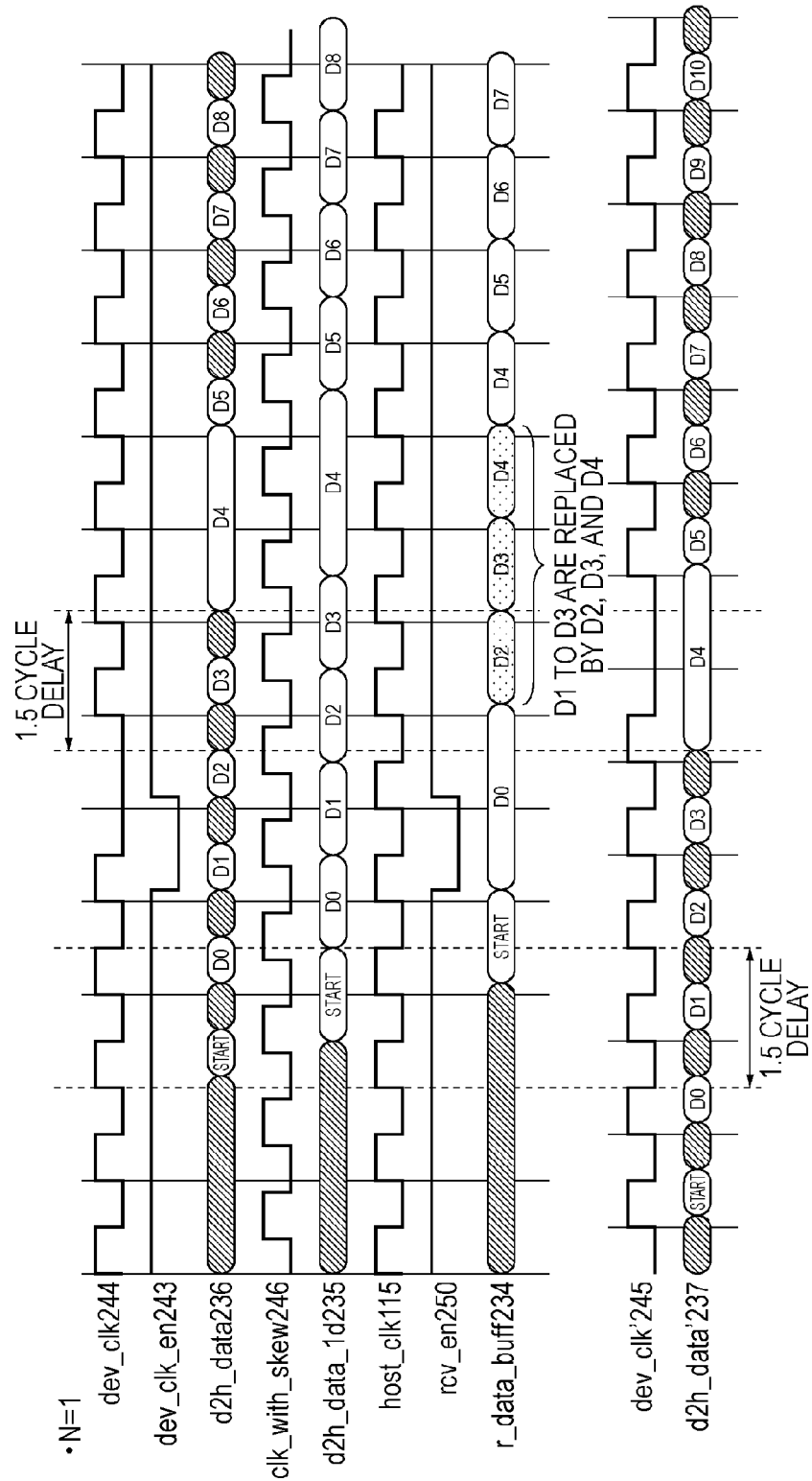
FIG. 10 is a timing chart illustrating the correlation between the number of gating cycles and a calibration pattern that is received.
Figure 11:
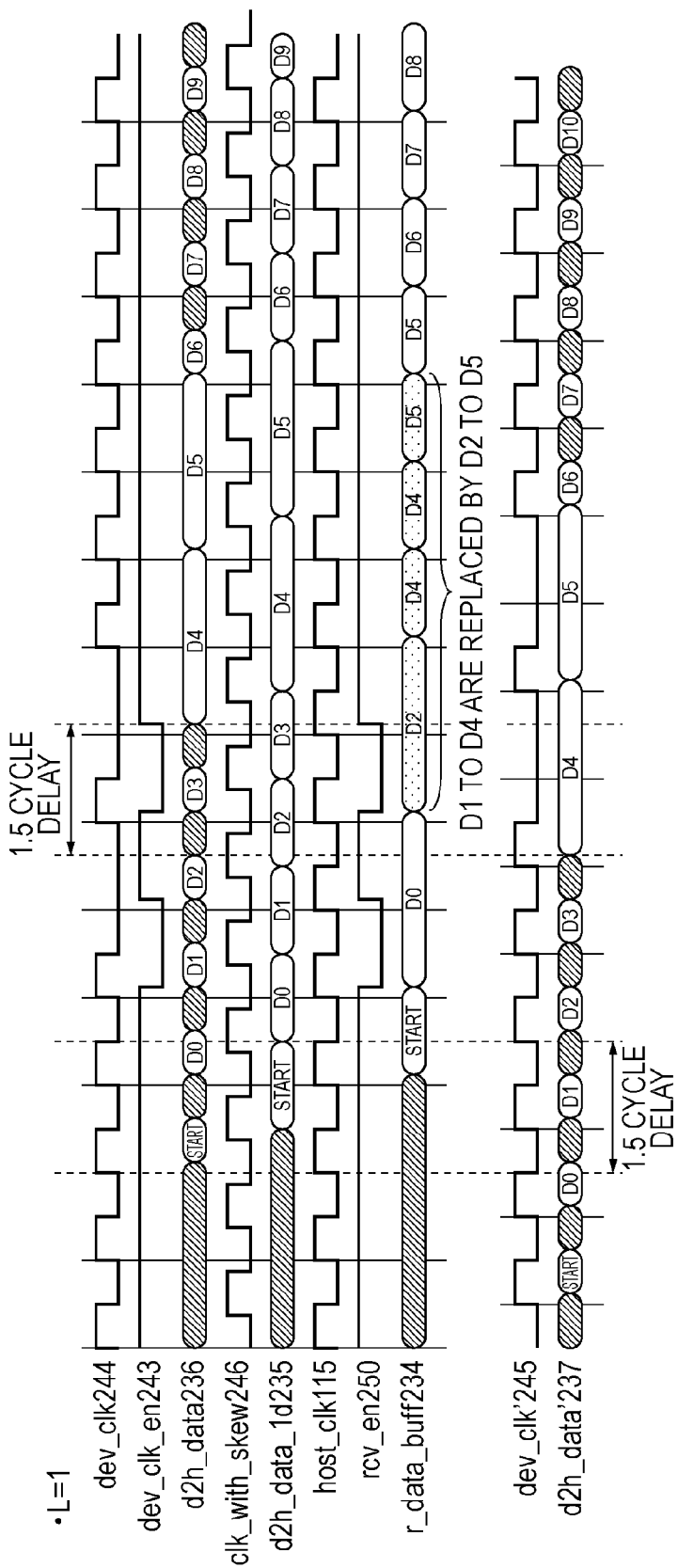
FIG. 11 is a timing chart illustrating the correlation between the number of cycles between gating operations and a calibration pattern that is received.
Figure 12:
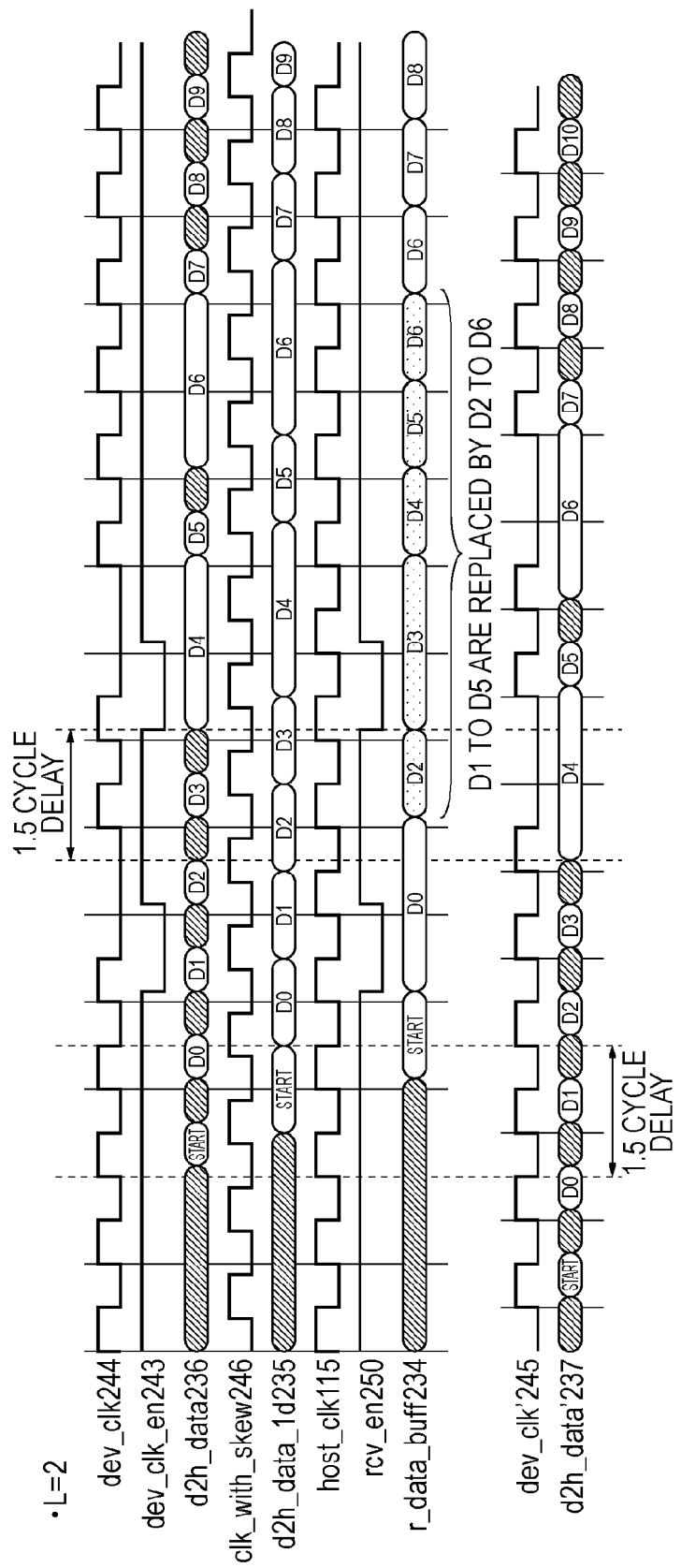
FIG. 12 is a timing chart illustrating the correlation between the number of cycles between gating operations and a calibration pattern that is received.
Figure 13:
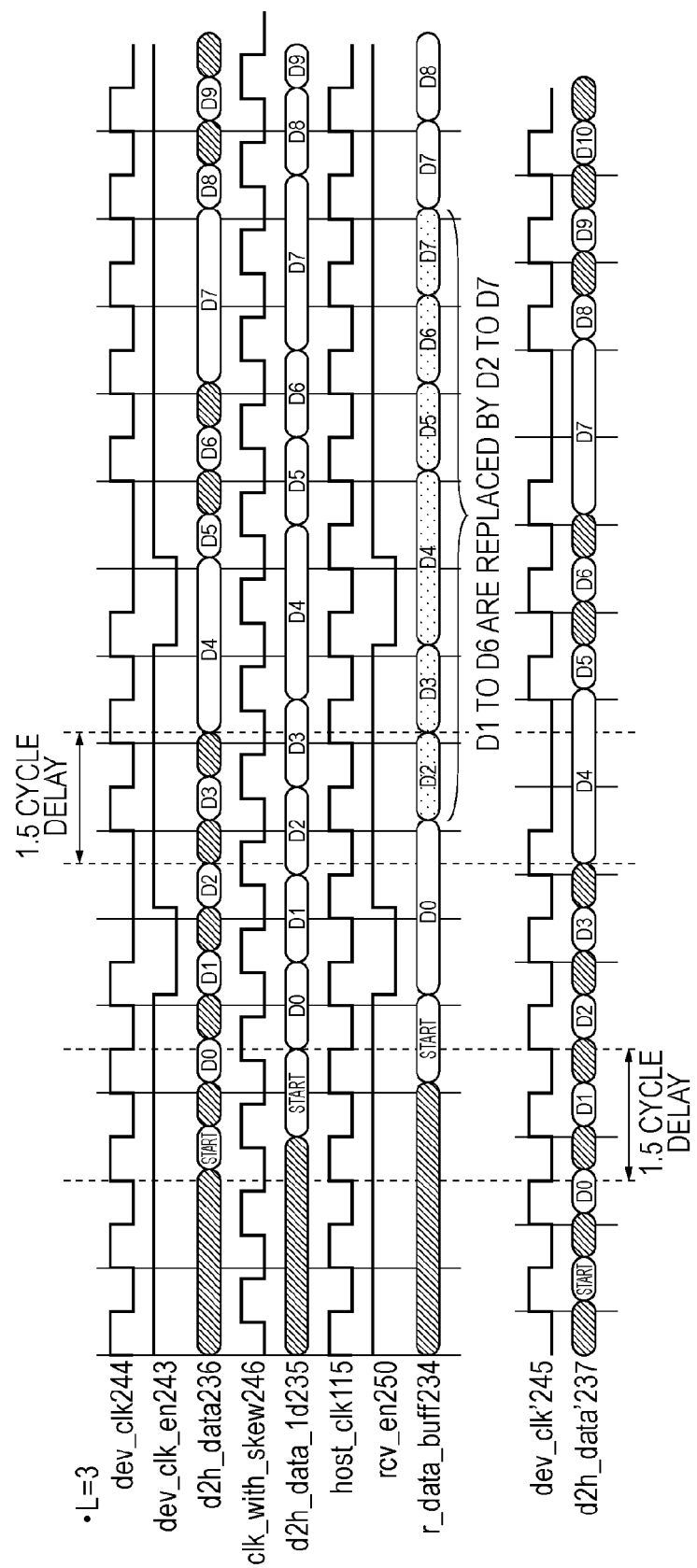
FIG. 13 is a timing chart illustrating the correlation between the number of cycles between gating operations and a calibration pattern that is received.
Figure 14:
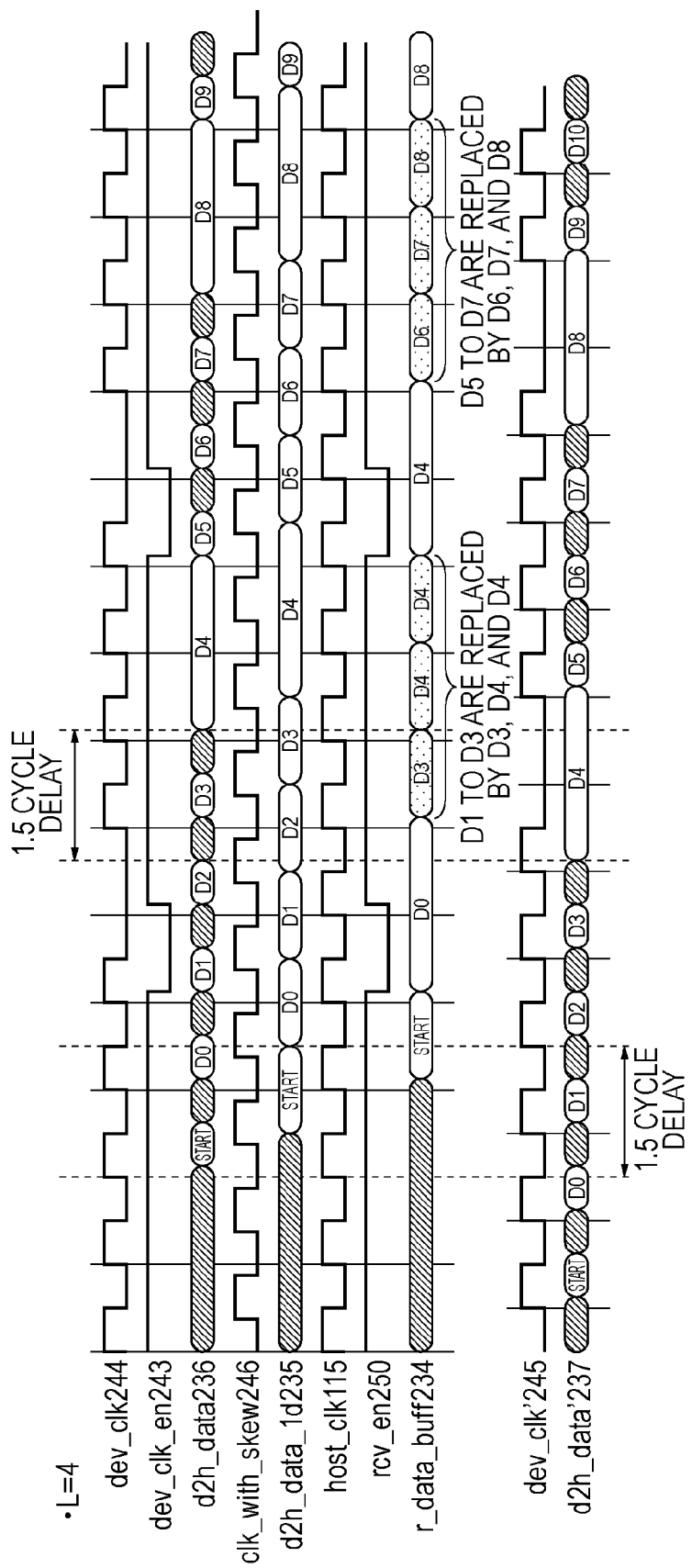
FIG. 14 is a timing chart illustrating the correlation between the number of cycles between gating operations and a calibration pattern that is received.

FIGS. 8, 9, and 10 illustrate waveforms during calibration when N is 3, 2, and 1, respectively. Referring to the waveforms of the r_data_buff 234 in FIGS. 8, 9, and 10, it can be seen that the data for M cycles has been replaced regardless of the value of N. However, what data the data is replaced by depends on the value of N. For example, if N=3, then, D1 to D3 are replaced by D4, and if N=2, then, D1 is replaced by D3 and D2 and D3 are replaced by D4. Further, if N=1, then, D1, D2, and D3 are replaced by D2, D3, and D4, respectively.

(3) Correlation Between a Cycle (L) Between Gating Operations and a Pattern that is Received When gating is performed a plurality of times, the correlation between L and a calibration pattern that is received (in a case where skew adjustment has been performed and cycle adjustment is incorrect) will be described, where L is a cycle from one gating time to the next gating time (for the definition of L, see FIG. 5). FIGS. 11, 12, 13, and 14 illustrate waveforms during calibration when L is 1, 2, 3, and 4, respectively. If L is greater than or equal to M, the plurality of gating operations can be regarded as independent gating operations. That is, the replacement of data for M cycles occurs a number of times equal to the number of times gating is performed. Otherwise, the plurality of gating operations have mutually correlations, and {M*(number of times gating is performed)−(M−L)} pieces of data are consecutively replaced.

(4) Correlation Between a Gating Start Position (S), a Gating End Position (E), and a Pattern that is Received The correlation between S, E, and a calibration pattern that is received (in a case where skew adjustment has been performed and cycle adjustment is incorrect) will be described, where S is the gating start position and E is the gating end position (for the definition of S and E, see FIG. 5).

Figure 15:
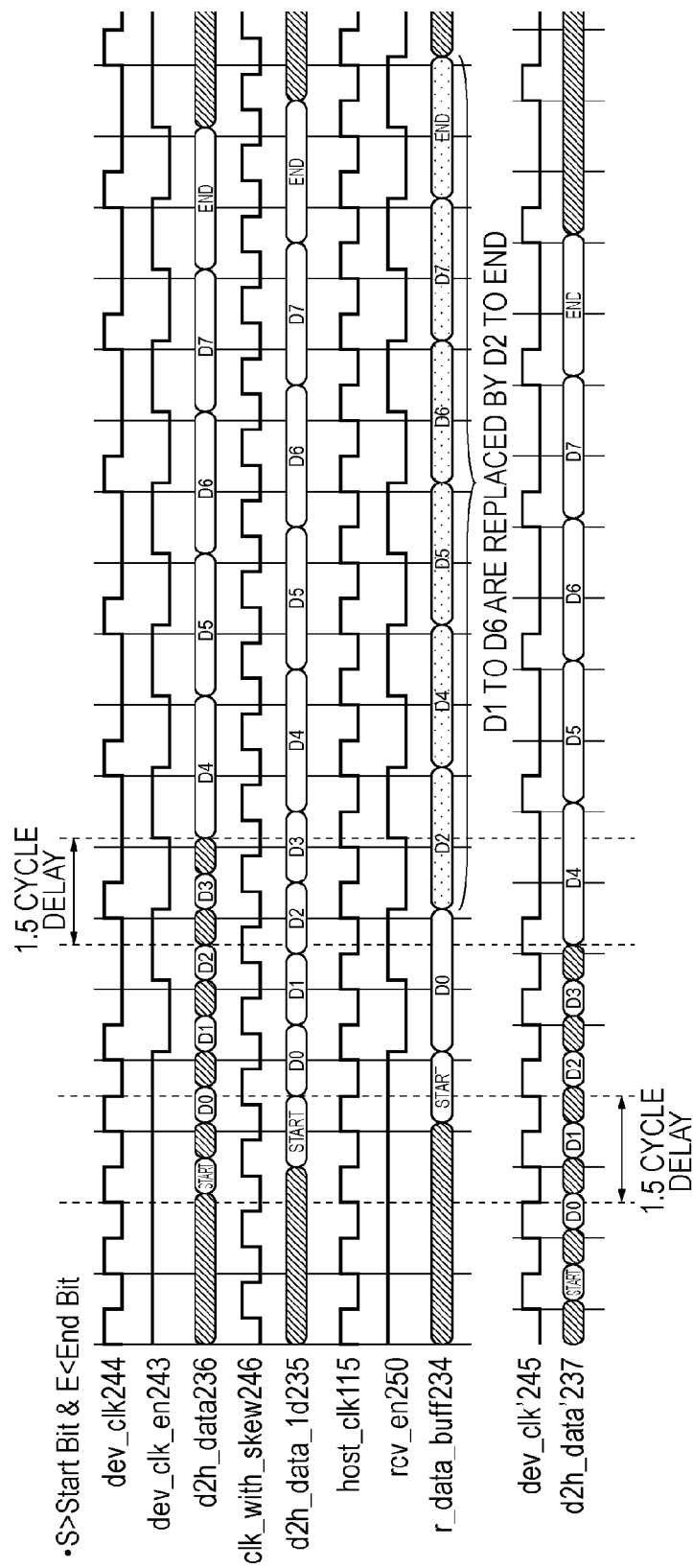
FIG. 15 is a timing chart illustrating the correlation between a gating start position, a gating end position, and a calibration pattern that is received.
Figure 16:
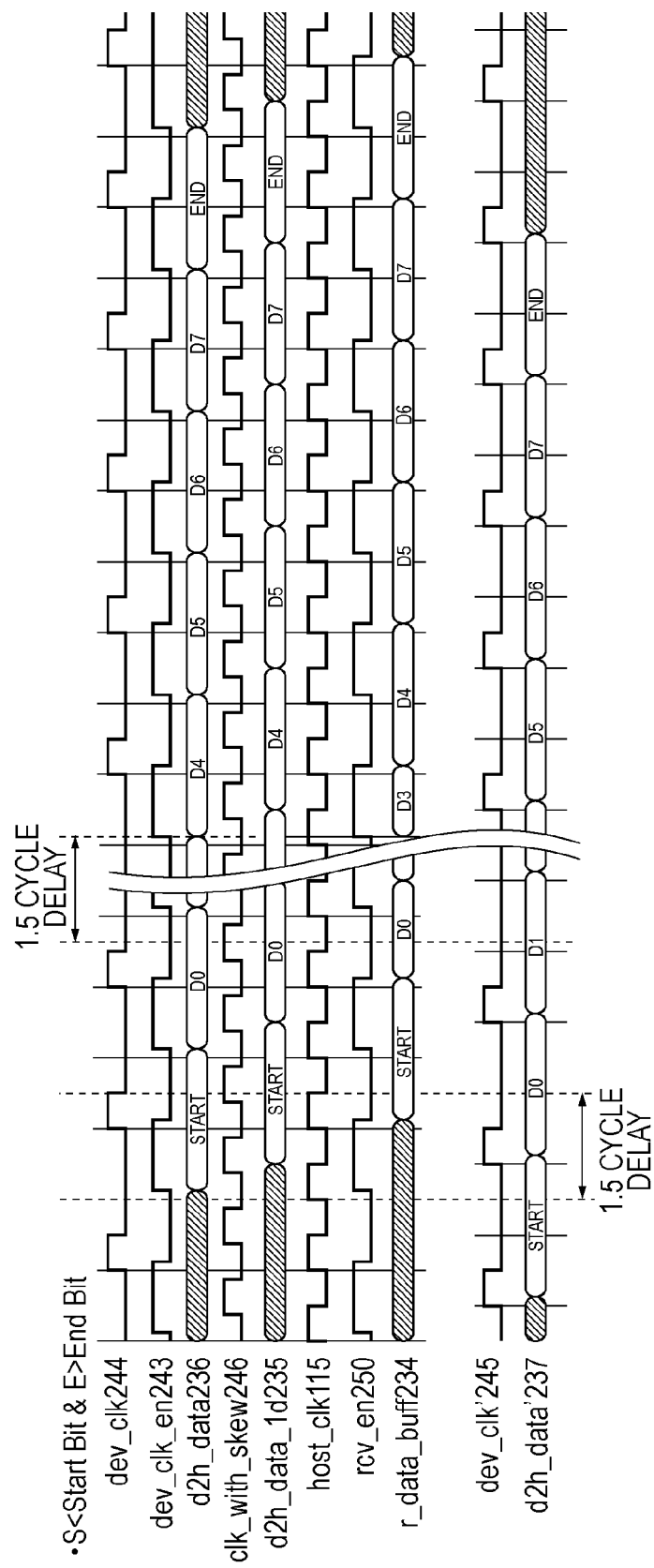
FIG. 16 is a timing chart illustrating the correlation between a gating start position, a gating end position, and a calibration pattern that is received.
Figure 17:
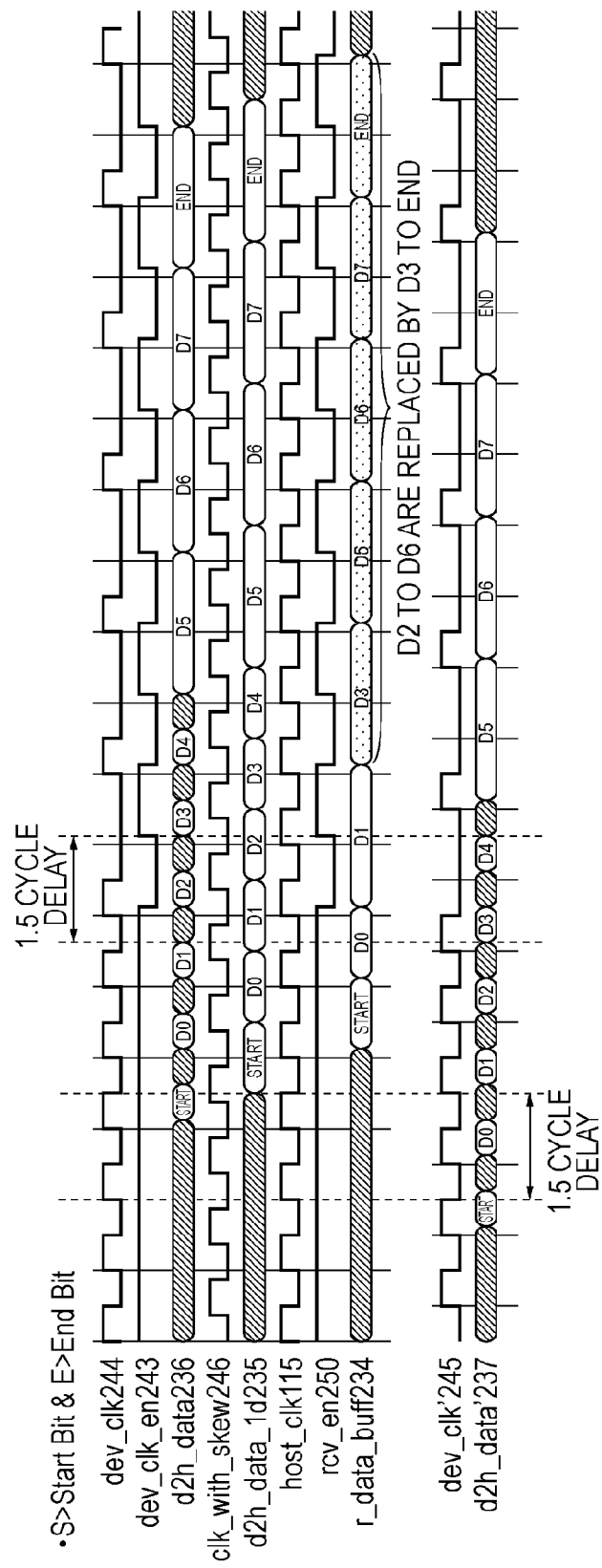
FIG. 17 is a timing chart illustrating the correlation between a gating start position, a gating end position, and a calibration pattern that is received.

FIGS. 15, 16, and 17 illustrate waveforms during calibration when the positional relationship between S and the start bit and the positional relationship between E and the end bit are changed. FIG. 15 illustrates waveforms when the gating start position S is placed after detection of the start bit and when the gating end position E is placed before detection of the end bit. FIG. 16 illustrates waveforms when the gating start position S is placed before detection of the start bit and when the gating end position E is placed after detection of the end bit. FIG. 17 illustrates waveforms when the gating start position S is placed after detection of the start bit and is the gating end position E is placed after detection of the end bit.

As in FIG. 16, when clock gating is periodically performed so as to be synchronous with one cycle of the host clock 115, if L>M is not satisfied and the gating start position S is placed at a position before the start bit while the gating end position E is placed at a position after the end bit, the pattern is not suitable for calibration. This is because data can be correctly received although cycle adjustment is incorrect.

If the gating start position S is placed after the start bit or the gating end position E is placed after the end bit, data is not received correctly in a situation where cycle adjustment is incorrect. Thus, it can be seen that this gating pattern is suitable for calibration. Therefore, it is necessary to arrange only one of the gating start position S and the gating end position E during reception of the calibration pattern or to take the cycle L between gating operations into account.

Further, although not directly illustrated in FIG. 15, 16, or 17, the gating pattern needs to be set so that the gating start position S or the gating end position E can be placed at a timing when the value of the calibration pattern received by the received data SP conversion unit 210 varies (in a period during which a predetermined number of different values described below are input). That is, the gating pattern is set so that the supply of the output clock 244 starts to be stopped or its stopping is canceled at one of timings at which the value of the calibration pattern varies. For example, the timing at which the value varies is the case of "01" (or "10"), and the gating pattern is set so that the gating start position S is placed at "1" in "01" (or "0" in "10") and the gating end position E is placed at "0" in "01" (or "1" in "10").

As described above, the calibration pattern and the gating pattern have the correlations (1) to (4) above. In the example of FIGS. 6 and 7, gating is performed during a cycle subsequent to the cycle during which "D3" in the calibration pattern is received. In the case of this example, due to the relationship between the cycle set value and the actual delay, "D4 to D6" can possibly be replaced by "D5 to D7". For this reason, even if all the values of "D4 to D7" in the calibration pattern are the same, the values before replacement and the values after replacement are the same, which is not desirable for the detection of a delay (cycle delay). In the example of FIGS. 6 and 7, "D4 to D7" in the calibration pattern may be changed to "0101" in terms of the correlations (1) to (4).

The above setting is based on the correlations (1) to (4). It is to be understood that, even if "1" and "0" are opposite, a corresponding expected value in this case may be set.

Further, the relationship between, when the above calibration pattern (expected value) is used, the difference from the actual number of cycles and the pattern that is received (the received data 236) is illustrated in FIG. 20. It is possible to determine the difference from the actual number of cycles on the basis of information indicating the relationship between the pattern that is received and the amount of delay illustrated in FIG. 20. It is necessary to set a pattern such that different calibration patterns can be received at 1:1 in accordance with M. Therefore, when the gating pattern according to the correlations (1) to (4) is used, a delay up to a predetermined number of cycles can be detected if the calibration pattern has a predetermined number of consecutive values (bits) (such as "1" or "0") that are different from the value input earlier to the external device controller 103. It is desirable that values that are different from the value input earlier (to the received data SP conversion unit 210), the number of which is greater than or equal to the number of delay cycles that can be detected, be consecutive. In a case where "D4 to D7" is "0101" described above, in the "101" portion, it can be guaranteed that values that are different from the preceding input value are consecutive.

Delay information (such as a lookup table as illustrated in FIG. 20 or a simple sequence) indicating the above relationship may be tested in advance and stored in the DRAM 106 or any other storage device that can be referred to by the CPU 101, and may be referred to by the CPU 101 when an amount of cycle delay is determined.

Figure 18:
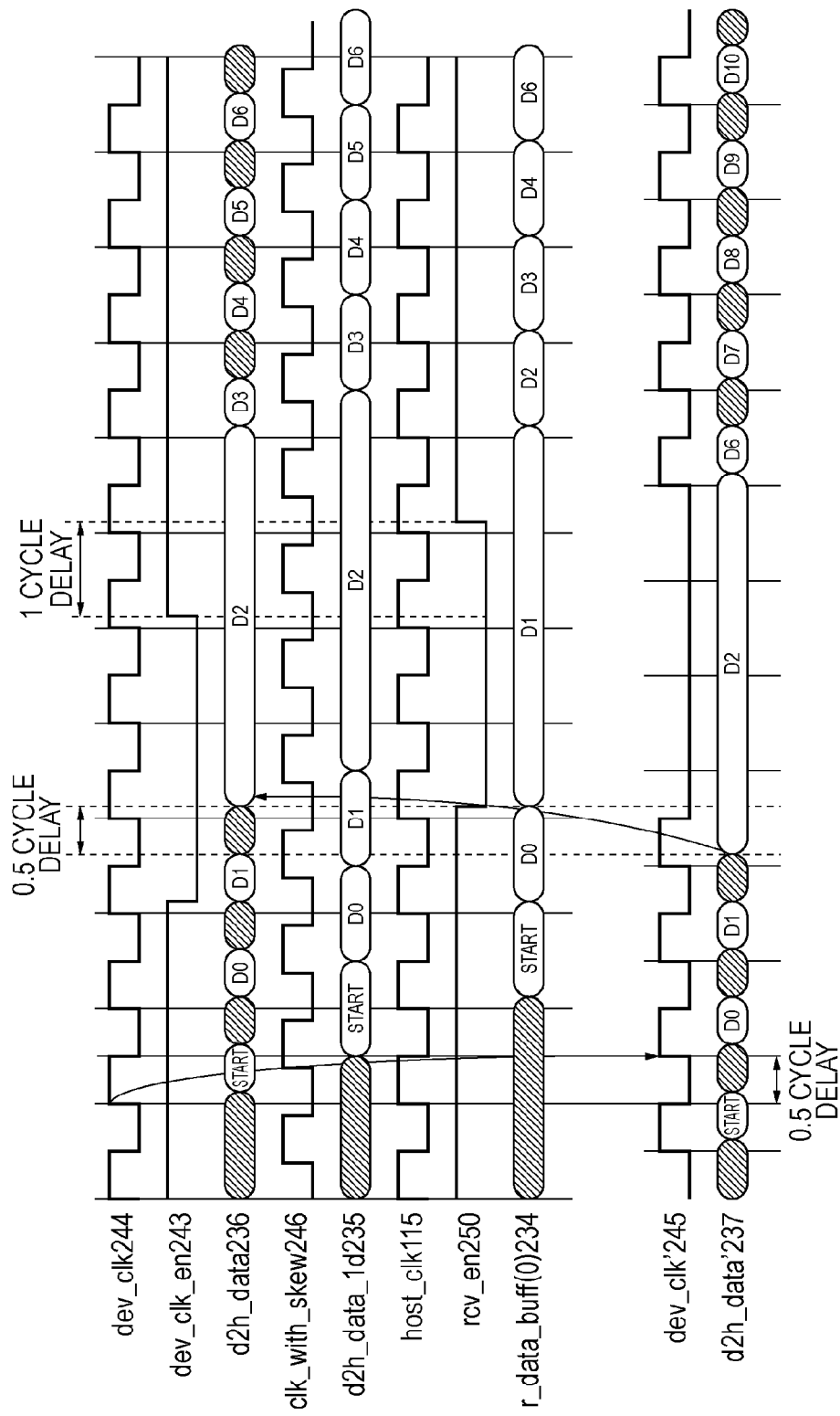
FIG. 18 is a timing chart of signals handled by the external device controller and the external device when a correct cycle setting is used.

Next, behavior of signals handled by the external device controller 103 and the external device 107 during reception of data in the operation with the configuration of FIG. 1 in which correct parameters (skew set value, cycle set value) are used is illustrated in FIG. 18. Similarly to the example of FIG. 24, the example of FIG. 18 illustrates waveforms when the cycle delay is one cycle and when calibration is completed and the cycle selection value 249 (the cycle set value 256) corresponding to one cycle is set. Note that the setting indicated by the correct cycle selection value 249 (cycle set value 256) is 1 when the delay caused in the received data 236 is one cycle. Since the setting indicated by the cycle selection value 249 is 1, the reception enable signal 250 is delayed by one cycle with respect to the output clock enable signal 243 by using the cycle control unit 603.

In the example of FIG. 18, the output clock enable signal 243 is de-asserted and the output clock 244 is gated at the time when the reception of "D0" of the serial format received data 236 is started. Although the output clock 244 is gated, "D1" and "D2" of the serial format received data 236 are transmitted from the external device 107. The reception enable signal 250 is also de-asserted one cycle after the de-assertion of the output clock enable signal 243 is started. In response to the de-assertion of the reception enable signal 250, the received data SP conversion unit 210 immediately stops receiving serial format received data.

Thus, reception of data is stopped while "D1" of the skew-adjusted received data 235 has been received. As can be seen when viewing the data of the first bit of the parallel format received data 234, "D1" has been successfully received and the data latch suspend timing of the received data SP conversion unit 210 has been successfully adjusted so as to address a cycle delay.

Further, the output clock enable signal 243 is asserted again one cycle after it is deasserted, and in response to the assertion, the gating of the output clock 244 is released. Here, even when the gating of the output clock 244 is released, due to a delay of one cycle or more in the received data 236 described above, "D2" of the serial format received data 236 is continuously transmitted from the external device 107.

Based on the amount of delay (one cycle) indicated by the cycle set value 256, the reception enable signal 250 is also asserted one cycle after the assertion of the output clock enable signal 243. In response to the assertion of the reception enable signal 250, the received data SP conversion unit 210 immediately resumes receiving serial format received data. Thus, "D2" of the serial format received data 236 can be correctly received. As can be seen when viewing the first bit of the parallel format received data 234, "D2" has been successfully received correctly and the data latch resume timing of the received data SP conversion unit 210 has been successfully adjusted so as to address a cycle delay.

As above, this exemplary embodiment can suppress completion of calibration with incorrect settings. Therefore, the received data 236 can be correctly detected even when the received data 236 has a delay of one cycle or more.

Further, according to the cycle control unit 603 in this exemplary embodiment, once a correct cycle set value 256 is set, the data latch suspend timing and the data latch resume timing of the received data SP conversion unit 210 can be delayed so as to correspond to the amount of cycle delay that occurs between the external device controller 103 and the external device 107. This suppresses the occurrence of failure to latch the data as illustrated in FIG. 24.

Further, while in the foregoing exemplary embodiment, the skew control unit 211 and the cycle control unit 603 are configured separately, skew adjustment and cycle adjustment may be combined into a single configuration, or may be combined into the received data SP conversion unit 210. Further, in skew adjustment, the adjustment is performed by inputting a clock whose shift has been corrected. However, a delay configuration (delay elements, flip-flops) for skew adjustment or cycle adjustment may be directly arranged in a system for supplying data, and an amount of delay may be selected using a selector or the like.

Further, in the foregoing exemplary embodiment, the opportunity to execute a calibration process has not been discussed. However, calibration may be performed with an opportunity similar to that of a known external device controller, thus achieving the effect of the present invention. For example, calibration may be implemented when the ASIC 100 is started, when the external device controller 103 is initialized, at intervals of a predetermined time (for example, at intervals of 10 msec at 208 MHz as defined in a standard such as the Secure Digital Extended Capacity (SDXC) standard), or at intervals of a predetermined number of cycles, or when the ASIC 100 detects a connection with the external device 107.

Further, in the foregoing exemplary embodiment, the cycle computation unit 602, the cycle setting register 601, and the expected value setting register 604 have been described as hardware, but may also be implemented in software by using the CPU 101 instead. In this case, the CPU 101 reads and executes a program for implementing the functions of the cycle computation unit 602 from the DRAM 106 or the like. Storage areas corresponding to various registers are reserved in a cache of the CPU 101 (or the DRAM 106), and the values stored in the various registers described above are stored in the storage areas.

The wire delay described above between the external device 107 and the external device controller 103 may presumably have a large variation in the amount of delay if the external device 107 is configured to be removably attached to the external device I/F 112. In actuality, a delay caused by various factors other than the length or material of the wire and the increase in temperature, such as contact failure, may presumably be included.

In the foregoing exemplary embodiment, which frequency the host clock 115 is operating at is not illustrated as an example. However, as the operating frequency increases, it is more difficult to detect a delay of one cycle or more caused in the received data 236 with the configuration illustrated in FIG. 21A, and calibration failure is more likely to occur. The frequency of the host clock 115 may presumably be increased in order to more quickly exchange data between the external device controller 103 and the external device 107. Therefore, the present invention may also contribute to the implementation of high-speed and high-reliability data communication.

Further, in the foregoing exemplary embodiment, the cycle computation unit 602 performs cycle adjustment by comparing a calibration pattern (received data 234) and an expected value. However, as skew adjustment, the CPU 101 may read an expected value and perform a comparison process.

Further, in the foregoing exemplary embodiment, the data portions (D0, D1, . . . in FIG. 21B) of the received data 236 are used for comparison. However, the CRC portions (CRC0, CRC1, . . . in FIG. 21B) calculated by the received data SP conversion unit 210, which serves as a calculation unit, may be used for comparison. In this case, it is necessary to compute and store in advance, for a calibration pattern stored in advance, CRCs that are received when the skew setting and the cycle setting are correct.

In the illustration of FIG. 1, the external device controller 103 and the external device 107 communicate with each other using a bus of 1-bit width. Instead, a bus of 4-bit width, a bus of 8-bit width, or the like may also be used, and the present invention can be applied without being limited to the bus width. However, for example, when a bus of 4-bit width (8-bit) is used, the skew control unit 211 may be provided with four flip-flops 218 and four delay selection units 217 so that skew adjustment can be performed for every 1-bit width. In this case, the received data SP conversion unit 210 is only required to merge 4-bit sequences, and the received data SP conversion unit 210, the reception buffer 209, or the like may require a configuration for reordering 4-bit data so as to match the data to be output from the external device 107.

Further, in the foregoing exemplary embodiment, only the example in which the host clock 115 has a single operating frequency has been described. However, operating frequencies may be switched by identifying the external device 107. For example, a frequency divider circuit for dividing the frequency of the host clock, a multiplier circuit, or the like may be provided between the clock generator 105 and the external device controller 103 to switch the frequency of the host clock to be input to the external device controller 103. In this case, in addition to the clock generator 105, the frequency divider circuit or the multiplier circuit also serves as a portion of an oscillation unit.

In this case, when the calibration described above is not successful, the host clock 115 that is input to the external device 107 may be reduced to a lower frequency so that the communication with the external device 107 may be stabilized. Examples of the case where calibration is not successful may include the case where the calibration described above occurs a predetermined number of times or more per unit time, and the case where the time required for calibration requires a predetermined time or more (for example, the number of times required for the round-robin operation or more). Further, in a case where the physical connector shape of the external device I/F 112 is designed so as to fit to the external device 107 of a specific type specified in the standard, a frequency specified in a specific type of standard may be used as a frequency to be switched in the divider circuit or the multiplier circuit (for example, if calibration is not successful at 208 MHz, the frequency may be switched to 100 MHz). This ensures that the backward compatibility of the external device controller 103 can be maintained when external devices of the same type have different operating frequencies depending on the version.

When the present invention is utilized in the external device 107 complying with the SDXC standard, it is possible to identify the standard of the external device 107 (or the type of communication between the external device 107 and the external device controller 103) before transmission and reception of data. In this case, the CPU 101 performs transmission and reception of the commands described above to instruct that identification information indicating the type (or communication type) of the external device 107 be returned. In accordance with the identification information, depending on the identified standard, the CPU 101 may cause the oscillation unit described above to switch the frequency to a high frequency (208 MHz) for SDXC or to a low frequency (50 Hz or 20 Hz) otherwise. If it can be determined that communication at a frequency so low that, as described above, a delay of one cycle or more does not affect reception of data is being used, the cycle adjustment function for calibration may be stopped.

Here, in a case where the present invention is applied to an external device 107 complying with the SDXC standard, the external device 107 is configured to transmit a 64-byte calibration pattern to the external device controller 103. In this case, the external device controller 103 may handle a calibration pattern for 64 bytes. However, attention may be focused on a portion including consecutive values that are different from the value input earlier by the detectable amount of delay cycle within 64 bytes. In this case, after a 64-byte calibration pattern received by the external device controller 103 is written to the DRAM 106, the CPU 101 may read just the address of the portion on which attention is focused. Further, some standards define a maximum amount of delay that can be allowed between the external device 107 and the external device controller 103. Thus, the number of different values (the predetermined number described above) that are consecutive to each other may be set on the basis of the allowed amount of delay. In this case, a larger number than the number corresponding to the allowed amount of delay may be set in advance as the predetermined number described above.

Further, the transmission buffer 207 or the reception buffer 209 in the foregoing exemplary embodiment may be a first-in-first-out (FIFO) buffer. In this case, a buffer full signal or a buffer empty signal may be created based on information indicating the available capacity (remaining capacity information) of the FIFO buffer, or the remaining capacity information may be used instead as it is. In this case, if the size of the data that can be stored in the FIFO buffer serving as the reception buffer 209 is greater than or equal to the size of the data of the calibration pattern, the calibration pattern may be temporarily written in the FIFO buffer, and, after that, the CPU 101 may use the calibration pattern directly for comparison. However, if the data size that can be stored in the FIFO buffer serving as the reception buffer 209 is smaller than that of the calibration pattern, the calibration pattern may be compared successively (for each predetermined cycle) in units of the data size that is less than or equal to the capacity of the FIFO buffer. Alternatively, a branch configuration may be obtained in which data is successively compared without being latched in the FIFO buffer serving as the reception buffer 209 during calibration. A comparator for data of predetermined cycles, which has a separate configuration from the CPU 101 and which is configured with a register from which an expected value is also read in units of the same data size, may be provided as a comparison unit. Otherwise, if the third clock control unit 223 is designed so as not to stop clocks in skew adjustment, the reception buffer 209 can possibly overflow.

Further, a control signal such as the output clock enable signal 243 in the foregoing exemplary embodiment may be configured such that a disable signal is asserted at a timing when an enable signal is de-asserted.

In the foregoing exemplary embodiment, the present invention has been described in the context of an information processing apparatus including the external device controller 103. However, the present invention can also be applied to the case where the information processing apparatus includes therein the configuration of the external device 107 described above, and may therefore be applicable to a device controller. Examples of an information processing apparatus according to the present invention may include various apparatuses such as an image processing apparatus and a calculation processing apparatus.

Furthermore, the present invention may also be implemented by executing the following process: Software (program) implementing the functions of the foregoing exemplary embodiment is supplied to a system or an apparatus via a network or various storage media, and a computer (or a CPU, a micro processing unit (MPU), or the like) of the system or apparatus reads and executes the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-295617, filed Dec. 25, 2009, which is hereby incorporated by reference herein in its entirety.

The invention claimed is:

1. An information processing apparatus comprising:
a supply unit configured to supply a clock to an external device;
an instruction unit configured to instruct the external device to transmit a calibration pattern;
a receiving unit configured to receive external device data including the calibration pattern that is output from the external device in synchronization with the clock;
a control unit configured to control the supply unit to stop supply of the clock in accordance with gating information indicating at which timing the supply of the clock is to be stopped;
a storage unit configured to hold delay information indicating a relationship between a calibration pattern to be received by the receiving unit and an amount of cycle delay;
a detection unit configured to detect the amount of cycle delay by comparing with the delay information a calibration pattern received, while the control unit controls the supply of the clock, by the receiving unit; and
a delay unit configured to delay a data latch timing of the receiving unit in accordance with the amount of cycle delay.

2. The information processing apparatus according to claim 1, further comprising:
an oscillation unit configured to oscillate the clock supplied from the supply unit;
a first delay unit configured to correct a phase shift by delaying the data received by the receiving unit by an amount that is smaller than one cycle of the clock oscillated by the oscillation unit; and
a second delay unit configured to correct a period-to-period shift in the data latch timing of the receiving unit by delaying a control signal for controlling the receiving unit by an integer multiple of one cycle of the clock oscillated by the oscillation unit and by inputting the control signal to the receiving unit.

3. The information processing apparatus according to claim 2, wherein the second delay unit includes a plurality of flip-flops each having an input and an output, the output of each flip-flop being connected in series with the input of the next flip-flop, and
wherein when the control signal is delayed every period, the output of one of the plurality of flip-flops is selectively output.

4. The information processing apparatus according to claim 1, further comprising:
a selection unit configured to cause one of a first clock control mode in which the supply unit is caused to stop supply of the clock and a second clock control mode in which the supply unit is not caused to stop supply of the clock to selectively function in accordance with gating information indicating at which timing the supply of the clock is to be stopped,
wherein the instruction unit instructs the external device to transmit a calibration pattern that is received by the receiving unit, and
wherein the selection unit causes the second clock control mode to function when a phase shift of the calibration pattern is adjusted, and causes the first clock control mode to function when a cycle delay of the calibration pattern is adjusted.

5. The information processing apparatus according to claim 4, further comprising a determination unit,
wherein the storage unit holds an expected value of a calibration pattern to be received, and
wherein the determination unit compares a calibration pattern received by the receiving unit while the control unit is being caused to be function by the selection unit with the expected value held in the storage unit, and determines whether or not a match is found.

6. The information processing apparatus according to claim 5, wherein the determination unit determines that the calibration pattern received by the receiving unit matches the expected value, and determines that adjustment of the data latch timing of the receiving unit has been completed.

7. The information processing apparatus according to claim 4, wherein the calibration pattern includes a plurality of values, and
wherein each of a predetermined number of consecutive values in the plurality of values is different from a preceding value.

8. The information processing apparatus according to claim 7, wherein the predetermined number is greater than or equal to the number of cycles corresponding to an amount of delay that can occur between the information processing apparatus and the external device.

9. The information processing apparatus according to claim 4, further comprising an identification unit configured to determine a type of communication with the external device,
    wherein when it can be determined that the external device is of a predetermined type, the selection unit causes the first clock control mode to function when the data latch timing of the receiving unit is adjusted.

10. The information processing apparatus according to claim 4, further comprising a holding unit configured to hold data received by the receiving unit, and to notify when the holding unit is not capable of holding data,
    wherein the selection unit causes a third clock control mode to function when adjustment of the data latch timing based on the calibration pattern is completed, the third clock control mode being a mode in which the supply unit is caused to stop supply of the clock in response to a notification from the holding unit.

11. The information processing apparatus according to claim 10, wherein the holding unit includes a first-in-first-out buffer, and
    wherein the notification is based on a signal indicating remaining capacity information on the first-in-first-out buffer.

12. The information processing apparatus according to claim 10, further comprising an identification unit configured to determine a type of communication with the external device,
    wherein when it can be determined that the external device is not of a predetermined type, the selection unit causes the third clock control mode to function when the data latch timing of the receiving unit is adjusted.

13. The information processing apparatus according to claim 1, wherein the gating information includes information indicating that the supply unit stops supply of a clock at a periodical timing.

14. The information processing apparatus according to claim 1, wherein the gating information indicates at least one of a timing at which the control unit causes the supply of the clock to start to be stopped, a timing at which stopping of the supply of the clock is canceled, and a period during which supply of a clock is stopped.

15. The information processing apparatus according to claim 1, wherein the control unit causes the supply of the clock to start to be stopped at, an at least one of timings, at which a value of a calibration pattern that has been received by the receiving unit varies.

16. The information processing apparatus according to claim 1, wherein the control unit cancels stopping of the supply of the clock at, an at least one of timings, at which a value of a calibration pattern that has been received by the receiving unit varies.

17. An information processing apparatus comprising:
    a supply unit configured to supply a clock to an external device;
    a receiving unit configured to receive data including pattern data that is output from the external device in synchronization with the clock; and
    a delay unit configured to delay an operation of the receiving unit in accordance with the pattern data received by the receiving unit from the external device,
    wherein the pattern data is acquired when the clock supply has been stopped.

18. An information processing method comprising:
    a supplying step of supplying a clock to an external device;
    a receiving step of receiving data including pattern data that is output from the external device in synchronization with the clock; and
    a delaying step of delaying an operation in the receiving step in accordance with the pattern data received from the external device in the receiving step,
    wherein the pattern data is acquired when the clock supply has been stopped.

19. An information processing method comprising:
    supplying a clock to an external device;
    sending instructions to the external device to transmit a calibration pattern;
    receiving external device data including the calibration pattern that is output from the external device in synchronization with the clock;
    stopping supply of the clock in accordance with gating information indicating at which time the supply of the clock is to be stopped;
    storing delay information indicating a relationship between a calibration pattern to be received by the receiving unit and an amount of cycle delay;
    detecting the amount of cycle delay by comparing with the delay information the received calibration pattern, while supplying the clock; and
    delaying a data latch timing in accordance with the amount of cycle delay.

* * * * *